(12) United States Patent
Lee et al.

(10) Patent No.: US 8,753,778 B2
(45) Date of Patent: Jun. 17, 2014

(54) NEGATIVE ACTIVE MATERIAL FOR RECHARGEABLE LITHIUM BATTERY, METHOD OF PREPARING THE SAME, AND RECHARGEABLE LITHIUM BATTERY COMPRISING THE SAME

(75) Inventors: Sung Man Lee, Chuncheon-si (KR); Byoung-Hoon Ahn, Sokcho-si (KR)

(73) Assignee: Knu-Industry Cooperation Foundation, Chunchon (KR)

( * ) Notice: Subject to any disclaimer, the term of this patent is extended or adjusted under 35 U.S.C. 154(b) by 94 days.

(21) Appl. No.: 13/122,986

(22) PCT Filed: Oct. 9, 2009

(86) PCT No.: PCT/KR2009/005803
§ 371 (c)(1),
(2), (4) Date: Apr. 7, 2011

(87) PCT Pub. No.: WO2010/041907
PCT Pub. Date: Apr. 15, 2010

(65) Prior Publication Data
US 2011/0195313 A1    Aug. 11, 2011

(30) Foreign Application Priority Data

Oct. 10, 2008   (KR) .................. 10-2008-0099845
Sep. 9, 2009    (KR) .................. 10-2009-0084996

(51) Int. Cl.
*H01M 4/13*   (2010.01)

(52) U.S. Cl.
USPC ......... 429/231.8; 429/218; 429/233; 429/231

(58) Field of Classification Search
CPC .................................................... H01M 4/583
USPC ............................... 429/231.8, 218, 233, 231
See application file for complete search history.

(56) References Cited

U.S. PATENT DOCUMENTS

| | | |
|---|---|---|
| 2005/0136330 A1 | 6/2005 | Mao et al. |
| 2005/0207966 A1* | 9/2005 | Zaghib ..................... 423/448 |
| 2007/0128518 A1* | 6/2007 | Uono et al. ............... 429/231.4 |

FOREIGN PATENT DOCUMENTS

| | | |
|---|---|---|
| EP | 0 527 054 | 2/1993 |
| EP | 0 740 356 | 10/1996 |
| JP | 2000-123835 | 4/2000 |
| KR | 10-0274233 | 9/2000 |
| KR | 10-0312695 | 4/2001 |
| KR | 10-0477970 | 7/2004 |
| WO | 2005/043653 | 5/2005 |
| WO | 2007/136164 | 11/2007 |

OTHER PUBLICATIONS

Oh et al "The relation of structural transition, thermal and electrical stability deintercalation of Li-CICs (II) for Li-EaGDICs and Li-EGDICs" Analytical Science & Technology (1996), 9(1), 43-51 ( SciFinder Abstract).*

Oh et al "The relation of structural transition, thermal and electrical stability deintercalation of Li-CICs (II) for Li-EaGDICs and Li-EGDICs" Analytical Science & Technology, vol. 9, No. I, 1996 Proffesional translation.*

\* cited by examiner

*Primary Examiner* — Patrick Ryan
*Assistant Examiner* — Alex Usyatinsky
(74) *Attorney, Agent, or Firm* — Lexyoume IP Meister, PLLC

(57) ABSTRACT

Disclosed is a negative active material for a rechargeable lithium battery is provided that includes composite particles including an amorphous or semi-crystalline carbon matrix, and crystalline graphite powder particles having an average particle diameter of 0.2 to 3 μm dispersed in the matrix. The composite particles have an average particle diameter of 4 to 40 μm. A method of preparing the same and a rechargeable lithium battery including the negative active material are also disclosed.

13 Claims, 23 Drawing Sheets

NEGATIVE ACTIVE MATERIAL FOR RECHARGEABLE LITHIUM BATTERY, METHOD OF PREPARING THE SAME, AND RECHARGEABLE LITHIUM BATTERY COMPRISING THE SAME

TECHNICAL FIELD

This disclosure relates to a negative active material for a rechargeable lithium battery, a method of preparing the same, and a rechargeable lithium battery including the same.

BACKGROUND ART

For a negative active material for a rechargeable lithium battery, a carbon-based material is generally used. The carbon-based material is classified into crystalline carbon and amorphous carbon, and the crystalline carbon includes natural graphite and artificial graphite. The natural graphite has recently been used as a negative active material due to its low cost, good voltage flatness, and large charge and discharge capacity.

Electrochemical characteristics of a negative active material for a rechargeable lithium battery are known to be affected by shapes of negative active material particles. Spherically shaped graphite has low anisotropy, and thus maintains uniformity of voltage and current distribution.

During charge and discharge of a rechargeable lithium battery, a graphite-based carbonaceous negative active material undergoes intercalation and deintercalation of lithium ions into graphite layers. High-rate charge and discharge characteristics depend on lithium ion diffusion speed into graphite particles. As the graphite particle size is reduced, high-rate charge and discharge characteristics may be improved, and thus small graphite particles as a negative active material have been required.

DISCLOSURE OF INVENTION

Technical Problem

One aspect of this disclosure provides a negative active material for a rechargeable lithium battery having excellent high-rate charge and discharge characteristics.

Another aspect of this disclosure provides a method of preparing the negative active material for a rechargeable lithium battery.

Yet another aspect of this disclosure provides a negative electrode including the negative active material.

Still another aspect of this disclosure provides a rechargeable lithium battery including the negative active material.

Solution to Problem

According to one aspect of this disclosure, a negative active material for a rechargeable lithium battery is provided that includes composite particles including an amorphous or semi-crystalline carbon matrix, and crystalline graphite powder particles having an average particle diameter of 0.2 to 3 μm dispersed in the matrix. The composite particles have an average particle diameter of 4 to 40 μm.

The crystalline graphite powder particles are obtained by separating and pulverizing crystalline graphite such as earthy graphite.

The negative active material may further include an amorphous or semi-crystalline carbon coating layer on the surface of the composite particles, and the coating layer has a thickness of 0.01 to 5 μm.

The crystalline graphite powder particles have a Raman spectrum peak ratio ($I_{1360}/I_{1580}$) of 1580 $cm^{-1}$ peak intensity ($I_{1580}$) relative to 1360 $cm^{-1}$ peak intensity ($I_{1360}$) of 0.1 to 0.5, and in one embodiment, 0.1 to 0.3.

The amorphous or semi-crystalline carbon may be obtained from an amorphous or semi-crystalline carbon precursor selected from the group consisting of a hard carbon source material of sucrose, a phenol resin, a naphthalene resin, a polyvinyl alcohol resin, a furfuryl alcohol resin, a polyacrylonitrile resin, a polyamide resin, a furan resin, a cellulose resin, a styrene resin, a polyimide resin, an epoxy resin, a vinyl chloride resin, and the like; and a soft carbon source material of coal pitch, petroleum pitch, polyvinylchloride, mesophase pitch, tar, low molecular weight heavy oil, and the like, but the precursor is not limited thereto.

The composite particles include the amorphous or semi-crystalline carbon and crystalline graphite powder particles at a mass ratio of 0.5:9.5 to 4:6.

According to another aspect of this disclosure, a method of preparing a negative active material for a rechargeable lithium battery is provided that includes: separating or pulverizing crystalline graphite to crystalline graphite powder particles having an average particle diameter of 0.2 to 3 μm; providing a mixture of the crystalline graphite powder particles and an amorphous or semi-crystalline carbon precursor; assembling the mixture to provide composite particles having an average particle diameter of 4 to 40 μm; and heat-treating the composite particles to carbonize the amorphous or semi-crystalline carbon precursor.

According to yet another aspect of this disclosure, a method of preparing a negative active material for a rechargeable lithium battery is provided that includes: separating or pulverizing earthy graphite to crystalline graphite powder particles having an average particle diameter of 0.2 to 3 μm; providing a mixture of the crystalline graphite powder particles and an amorphous or semi-crystalline carbon precursor; assembling the mixture to provide a composite particle having an average particle diameter of 4 to 40 μm; and heat-treating the composite particles to carbonize the amorphous or semi-crystalline carbon precursor.

The method of preparing the negative active material may further include coating the composite particles with an amorphous or semi-crystalline carbon precursor after carbonizing the amorphous or semi-crystalline carbon precursor.

The amorphous or semi-crystalline carbon precursor may be selected from the group consisting of a hard carbon source material of a phenol resin, a naphthalene resin, a polyvinyl alcohol resin, a polyamide resin, a furan resin, an epoxy resin, or a vinyl chloride resin; and soft carbon source material of coal pitch, petroleum pitch, tar, or low molecular weight heavy oil.

The heat treatment may be performed at 900 to 3000° C.

According to still another aspect of this disclosure, a negative electrode for a rechargeable lithium battery including the negative active material is provided.

According to another aspect of this disclosure, a rechargeable lithium battery is provided with a positive electrode including a positive active material being capable of intercalating and deintercalating lithium ions, a negative electrode including the negative active material, and an electrolyte.

Other aspects of this disclosure are described in the following detailed description.

Advantageous Effects of Invention

The negative active material provides a rechargeable lithium battery having excellent electrochemical characteristics such as high-rate charge and discharge characteristics.

Figure 1:
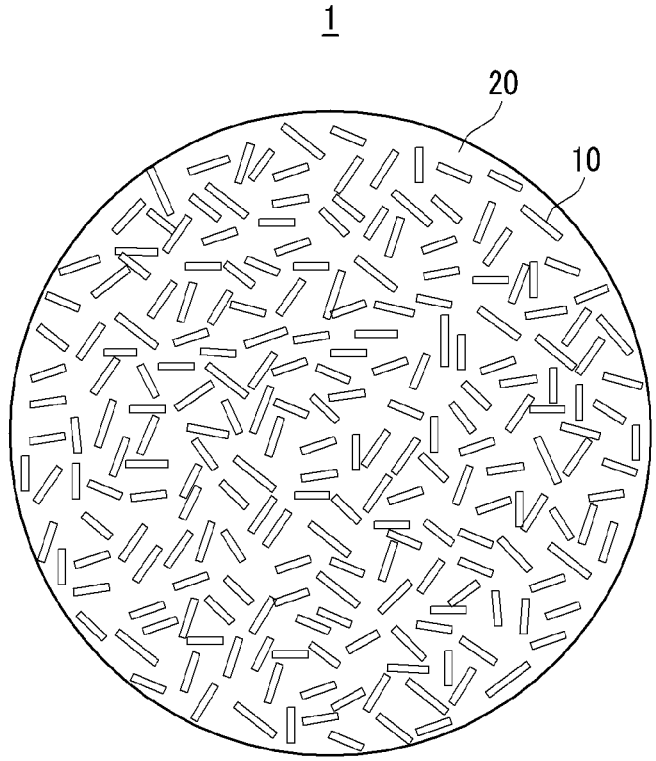
FIG. 1 is a schematic cross-sectional view of a negative active material according to one embodiment.

DESCRIPTION OF REFERENCE NUMERALS INDICATING PRIMARY ELEMENTS IN THE DRAWINGS 1, 2: composite particle
10: crystalline graphite powder particle
20: amorphous or semi-crystalline carbon
30: coating layer

BEST MODE FOR CARRYING OUT THE INVENTION

Exemplary embodiments of this disclosure will hereinafter be described in detail. However, these embodiments are only exemplary, and this disclosure is not limited thereto.

FIG. 1 is a schematic cross-sectional view of a composite particle 1 constituting the negative active material according to one embodiment. Referring to FIG. 1, the negative active material according to one embodiment includes composite particles 1 including a matrix of amorphous or semi-crystalline carbon 20 and crystalline graphite powder particles 10 dispersed in the matrix. As shown in FIG. 1, the composite particle 1 as the negative active material includes the amorphous or semi-crystalline carbon 20 surrounding the crystalline graphite powder particles 10 that are spaced apart from each other.

The crystalline graphite powder particles 10 are obtained by pulverizing crystalline graphite. The crystalline graphite includes natural graphite such as earthy graphite.

The natural graphite may be classified depending on carbon content in a natural state, particle size, ash content, and use. The natural graphite is classified into earthy graphite and flake graphite. The earthy graphite is generally referred to as microcrystalline graphite. Compared with flake graphite, the earthy graphite mainly includes thermally-modified coal or carbonate sedimentary rock.

Illustrating the earthy graphite and the flake graphite in more detail, both are refined to purity of more than 95% after being mined in a graphite mine. However, the earthy graphite is formed of fine particles and has an average particle diameter ranging from about 0.1 to 50 μm, while the flake graphite is formed by piling up several flat flake particles and has an average particle diameter ranging from about 100 to 200 μm. In addition, when the earthy graphite and the flake graphite are pulverized in a milling process, the term "pulverize" is used to denote separating a chunk of the earthy graphite, while the flake graphite is pulverized into flat flask particles. When the earthy graphite and the flake graphite are assembled into a spherical shape, the flake graphite is assembled like several cabbage leaves wrapped in a mechanical method. However, the earthy graphite is not assembled into a spherical shape in the same method.

In one embodiment, crystalline graphite is obtained by separating and pulverizing natural graphite. The crystalline graphite includes crystalline graphite powder particles having an average particle diameter of 0.2 to 3 μm. The crystalline graphite powder having the above average particle diameter may be preferably separated from earthy graphite among natural graphite. It may include any natural graphite other than the earthy graphite as long as it has the above average particle diameter through separation or pulverization.

Since the earthy graphite has a clay structure formed of agglomerated fine graphite, it needs to be separated or pulverized into fine crystalline graphite powder particles 10. In other words, when graphite particles are lumped, they have a small specific surface area that can react with Li ions per unit volume. On the other hand, when they are separated or pulverized into particles, they have a larger specific surface area that can react with Li ions, so that Li ions can be easily intercalated and deintercalated. Accordingly, they can bring about excellent high-rate charge and discharge characteristics.

Crystalline graphite powder particles 10 separated or pulverized from the earthy graphite have no particular limit, but in particular, may be amorphous or a flake.

The crystalline graphite powder particles 10 may be fine particles having an average particle diameter of 5 μm or less, 3 μm or less, 0.2 to 3 μm, and more particularly 0.5 to 2 μm. When the crystalline graphite powder particles 10 have an average particle diameter within the range, the fine crystalline graphite powder particles 10 reduce the diffusion distance of lithium ions during the charge and discharge, and thereby lithium ions are easily diffused therein, improving high rate characteristics. In other words, lithium ions are rapidly intercalated and deintercalated between graphite layers of the crystalline graphite powder particles 10, accomplishing excellent high rate characteristics.

The crystalline graphite powder particles 10 have a Raman spectrum peak ratio ($I_{1360}/I_{1580}$) of 1580 cm$^{-1}$ peak intensity ($I_{1580}$) relative to 1360 cm$^{-1}$ peak intensity ($I_{1360}$) of 0.1 to 0.5, and in one embodiment, 0.1 to 0.3. The peak intensity ratio ($I_{1360}/I_{1580}$) denotes surface crystallinity of the graphite powder particles 10. When the peak intensity ratio ($I_{1360}/I_{1580}$) is within the range, it may maintain excellent crystallinity, securing excellent initial charge and discharge efficiency.

The amorphous or semi-crystalline carbon 20 may be obtained from a amorphous or semi-crystalline carbon precursor selected from the group consisting of a hard carbon source material of sucrose, a phenol resin, a naphthalene resin, a polyvinyl alcohol resin, a furfuryl alcohol resin, a polyacrylonitrile resin, a polyamide resin, a furan resin, a cellulose resin, a styrene resin, a polyimide resin, an epoxy resin, a vinyl chloride resin, and the like; and a soft carbon source material of coal pitch, petroleum pitch, polyvinylchloride, mesophase pitch, tar, low molecular weight heavy oil, and the like, but the precursor is not limited thereto.

The crystalline graphite powder particles 10 form a composite particle 1 in which the crystalline graphite powder particles 10 are dispersed in the amorphous or semi-crystalline carbon 20 matrix.

The composite particle 1 has no particular limit in shape, but in particular, may be close to a spherical shape.

The composite particle 1 may have an average particle diameter ranging from 4 to 40 μm and in particular, 4 to 20 μm. When a composite particle 1 has an average particle diameter within the range, a negative active material may have a surface area increase, not losing initial non-reversible capacity but keeping appropriate diffusion distance among lithium ions during the charge and discharge and thus, accomplishing excellent high-rate charge and discharge characteristics.

According to one embodiment, a composite particle 1 may include amorphous or semi-crystalline carbon 20 in a mass % of 2 to 40 and crystalline graphite powder particles 10 in a mass % of 60 to 98. When the amorphous or semi-crystalline carbon 20 and the crystalline graphite powder particles 10 are included within the mass % ratio, a rechargeable lithium battery may have excellent initial charge and discharge efficiency.

In addition, the composite particle 1 may include amorphous or semi-crystalline carbon 20 and crystalline graphite powder particles 10 in a mass ratio ranging from 0.5:9.5 to 4:6 and in particular, from 0.5:9.5 to 3:7. When the amorphous or semi-crystalline carbon 20 and the crystalline graphite powder particles 10 have a mass ratio within the range, the crystalline graphite powder particles 10 are sufficiently assembled. Accordingly, as a rechargeable lithium battery has almost no initial non-reversible capacity loss but has increased reversible capacity, it may have excellent initial charge and discharge efficiency.

Figure 2:
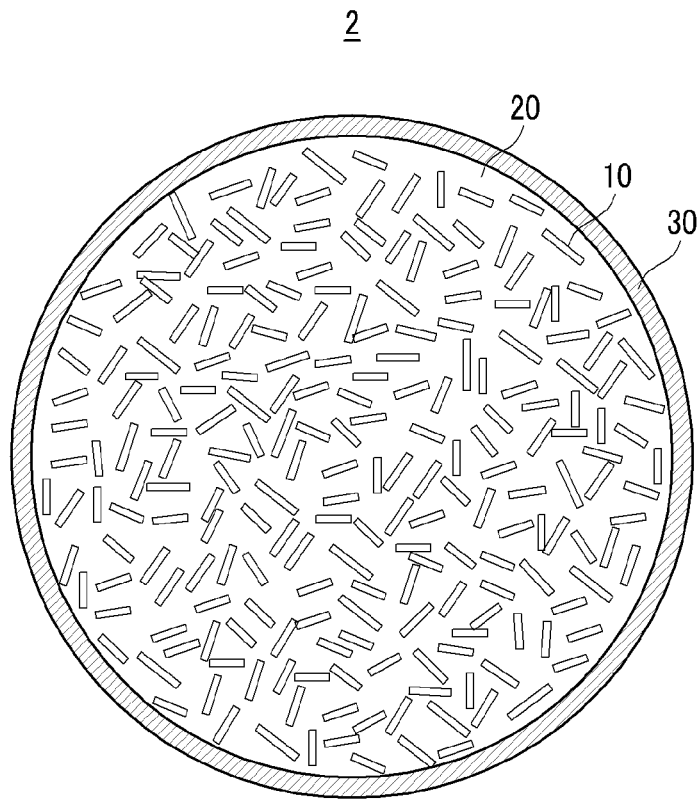
FIG. 2 is a schematic cross-sectional view of a negative active material according to another embodiment.

FIG. 2 is a schematic cross-sectional view of a composite particle 2 constituting the negative active material according to another embodiment. Referring to FIG. 2, a negative active material according to one embodiment may include a composite particle 2 having a coating layer 30 including amorphous or semi-crystalline carbon 20 on the surface of a composite particle 1, in which the crystalline graphite powder particles 10 of FIG. 1 are dispersed on a matrix of amorphous or semi-crystalline carbon 20.

The coating layer 30 may be 0.01 to 5 μm thick, and in particular, 0.01 to 2 μm thick. When the coating layer 30 has a thickness within the range, the surface is sufficiently coated, having almost no non-reversible capacity loss during reaction with an electrolyte and resultantly accomplishing excellent high-rate charge and discharge characteristics.

The amorphous or semi-crystalline carbon forming the coating layer 30 may be the same precursor material as amorphous or semi-crystalline carbon 20 including a matrix of the aforementioned composite particle. A matrix of the composite particle 2 including a coating layer 30 on the surface of the composite particle and the coating layer 30 include amorphous or semi-crystalline carbon prepared of the same or a different precursor.

According to another embodiment, a method for preparing the negative active material for a rechargeable lithium battery is provided.

The negative active material for a rechargeable lithium battery is prepared by the method of: separating or pulverizing crystalline graphite such as earthy graphite to crystalline graphite powder particles having an average particle diameter of 0.2 to 3 μm; providing a mixture of the crystalline graphite powder particles and an amorphous or semi-crystalline carbon precursor; assembling the mixture to provide composite particles having an average particle diameter of 4 to 40 μm; and heat-treating the composite particles to carbonize the amorphous or semi-crystalline carbon precursor.

The pulverization is performed in a common milling process, and for example, includes a ball mill, an attrition mill, a vibration mill, a disk mill, a jet mill, a rotor mill, and the like. Herein, the pulverization can be performed at various speeds (rpm) for various amounts of time, depending on milling devices and the amount of material, which can be appropriately controlled by those who have common knowledge in this art.

The crystalline graphite powder particles are mixed with the amorphous or semi-crystalline carbon precursor in a method selected from the group consisting of a dry method, a wet method, and a combination thereof.

In addition, the mixture of the crystalline graphite powder particles with the amorphous or semi-crystalline carbon precursor is assembled into a spherical shape using a common assembling device.

The heat treatment may be performed at 900 to 3000° C., and in particular, at 900 to 2200° C. When it is performed within the temperature range, amorphous and semi-crystalline carbon precursor may be sufficiently carbonized, accomplishing excellent charge and discharge characteristic and sufficiently removing other elements as impurities.

In addition, the heat treatment is performed under an inert atmosphere and sometimes under vacuum by implanting a gas selected from the group consisting of nitrogen, argon, hydrogen, and a mixed gas thereof.

A composite particle prepared in the aforementioned method may include 2 to 40 mass % of amorphous or semi-crystalline carbon and 60 to 98 mass % of crystalline graphite powder particles. This ratio may be adjusted by regulating the ratio of the amorphous or semi-crystalline carbon precursor.

According to one embodiment, a negative active material for a rechargeable lithium battery may further include coating the composite particles using an amorphous or semi-crystalline carbon precursor. The composite particle may be one before or after carbonizing the amorphous or semi-crystalline carbon precursor through the heat treatment.

The coating may include various generally-used coating methods. For example, an amorphous or semi-crystalline carbon precursor and composite particles are put in a mixer to knead them by imposing strong mechanical shear force at an appropriate temperature for softening the amorphous or semi-crystalline carbon precursor or higher. In addition, composite particles are mixed with a solution prepared by dissolving an amorphous or semi-crystalline carbon precursor in an appropriate solvent. Then, the solvent is removed from the mixture. The resulting product is heat-treated for carbonization at a temperature ranging from 900 to 3000° C.

According to another embodiment, a negative electrode for a rechargeable lithium battery including the negative active material is provided.

According to a further embodiment, provided is a rechargeable lithium battery including a positive electrode including a positive active material being intercalating and deintercalating lithium ions, a negative electrode including the negative active material, and an electrolyte.

Rechargeable lithium batteries may be classified as lithium ion batteries, lithium ion polymer batteries, and lithium polymer batteries according to the presence of a separator and the kind of electrolyte used in the battery. The rechargeable lithium batteries may have a variety of shapes and sizes, and include cylindrical, prismatic, and coin-type batteries, and may be a thin film battery or a bulk-type battery. Structures and fabricating methods for lithium ion batteries pertaining to this disclosure are well-known in the art.

The negative electrode includes a negative active material, and the negative active material includes the above negative active material or a mixture of the above negative active material and a carbonaceous negative active material such as graphite.

The negative electrode may be fabricated as follows: a composition for a negative active material layer is prepared by mixing the negative active material, a binder, and selectively a conductive agent; and then the composition for a negative active material layer is coated on a negative current collector such as copper.

Examples of the binder include polyvinyl alcohol, carboxylmethyl cellulose/styrene-butadiene rubber, hydroxypropylene cellulose, diacetylene cellulose, polyvinylchloride, polyvinylpyrrolidone, polytetrafluoroethylene, polyvinylidene fluoride, polyethylene, or polypropylene and the like, but are not limited thereto.

Examples of the conductive agent include natural graphite, artificial graphite, carbon black, acetylene black, ketjen black, carbon fiber, and a metal powder or metal fiber including copper, nickel, aluminum, silver, and the like. The conductive agent may be mixed with a conductive material such as a polyphenylene derivative and the like.

The positive electrode includes a positive active material. The positive active material includes a compound (lithiated intercalation compound) being capable of reversibly intercalating and deintercalating lithium ions. The positive active material may include a composite oxide including at least one selected from the group consisting of cobalt, manganese, and nickel, as well as lithium.

The positive electrode may be fabricated as follows: a composition for a positive active material layer is prepared by mixing the positive active material, a binder, and selectively a conductive agent; and then the composition for a positive active material layer is coated on a positive current collector such as aluminum.

The electrolyte of a rechargeable lithium battery may include a non-aqueous electrolyte or a generally-known solid electrolyte.

The non-aqueous organic solvent acts as a medium for transmitting ions taking part in the electrochemical reaction of the battery. The non-aqueous organic solvent may include a carbonate-based, ester-based, ether-based, or ketone-based solvent. The carbonate-based solvent includes dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like. The ester-based solvent may include methyl acetate, ethyl acetate, n-propyl acetate, and the like.

The rechargeable lithium battery may further include a separator between the negative electrode and the positive electrode, as needed. Non-limiting examples of suitable separator include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

MODE FOR THE INVENTION

The following examples illustrate this disclosure in more detail. These examples, however, should not in any sense be interpreted as limiting the scope of this disclosure.

EXAMPLES

Example 1

Fine crystalline graphite powder particles with an average particle diameter (D50) of 1.8 μm were prepared by separating or pulverizing earthy graphite with an average particle diameter (D50) of 16.4 μm in a jet mill method. The crystalline graphite powder particles were mixed with petroleum pitch (carbon yield: 63 mass %), which is an amorphous or semi-crystalline carbon precursor, and then assembled into a spherical shape, preparing composite particles with an average particle diameter (D50) of 16 μm. The composite particles were heat-treated at 1200° C. for 1 hour under an argon atmosphere to carbonize the amorphous or semi-crystalline carbon precursor. Herein, the composite particles include the amorphous or semi-crystalline carbon and the crystalline graphite powder particles in a mass ratio of 3:7.

These composite particles were used as a negative active material.

Example 2

Primary composite particles were prepared by mixing fine crystalline graphite powder particles having an average particle diameter (D50) of 1.8 μm with petroleum pitch (carbon yield: 63 mass %), which is an amorphous or semi-crystalline carbon precursor, in a jet mill method, and then assembling them into a spherical shape according to the same method as in Example 1. Herein, the composite particles included the amorphous or semi-crystalline carbon and the crystalline graphite powder particles in a mass ratio of 2:7.

Next, secondary composite particles were prepared by further adding petroleum pitch (carbon yield: 63 mass %), which is an amorphous or semi-crystalline carbon precursor, onto the surface of the primary composite particles. The secondary composite particles include amorphous or semi-crystalline carbon and the primary composite particles in a mass ratio of 1:9. The secondary composite particles had an average particle diameter (D50) of 16 μm. They were heat-treated under the same conditions as in Example 1 to carbonize the amorphous or semi-crystalline carbon precursor.

These composite particles were used as a negative active material.

Example 3

Primary composite particles were prepared by mixing fine crystalline graphite powder particles having an average particle diameter (D50) of 1.8 μm with petroleum pitch (carbon yield: 63 mass %), which is an amorphous or semi-crystalline carbon precursor, in a jet mill method, and then assembling them into a spherical shape according to the same method as in Example 1. The composite particles were heat-treated at 1200° C. for 1 hour under an argon atmosphere to carbonize the amorphous or semi-crystalline carbon precursor. The composite particles included the amorphous or semi-crystalline carbon and the crystalline graphite powder particles in a mass ratio of 2:7.

Next, secondary composite particles were prepared by mixing the composite particles with petroleum pitch (carbon yield: 63 mass %), which is an amorphous or semi-crystalline carbon precursor, and heat-treating the mixture at 1200° C. for 1 hour in order to coat the amorphous or semi-crystalline carbon precursor on the surface of the composite particles. The secondary composite particles included the amorphous or semi-crystalline carbon and the primary composite particles in a mass ratio of 1:9.

Example 4

Fine crystalline graphite powder particles with an average particle diameter (D50) of 1.6 μm were prepared by separating or pulverizing amorphous graphite with an average particle diameter (D50) of 16.4 μm in a jet mill method. The crystalline graphite powder particles were mixed with petroleum pitch (carbon yield: 63 mass %), which is an amorphous or semi-crystalline carbon precursor, preparing composite particles having an average particle diameter (D50) of 16 μm in the same mass ratio and process as in Example 1. The composite particles included the amorphous or semi-crystalline carbon and the crystalline graphite powder particles in a mass ratio of 3:7.

This composite particles were used as a negative active material.

Example 5

Fine crystalline graphite powder particles having an average particle diameter (D50) of 2.1 μm were prepared by separating or pulverizing earthy graphite having an average particle diameter (D50) of 16.4 μm in a jet mill method. The crystalline graphite powder particles were mixed with petroleum pitch (carbon yield: 63 mass %), which is an amorphous or semi-crystalline carbon precursor, to prepare composite particles having an average particle diameter (D50) of 16 μm according to the same mass ratio and process as in Example 1. The composite particles included the amorphous or semi-crystalline carbon and the crystalline graphite powder particles in a mass ratio of 3:7.

These composite particles were used as a negative active material.

Example 6

Fine crystalline graphite powder particles having an average particle diameter (D50) of 2.4 μm were prepared by separating or pulverizing earthy graphite having an average particle diameter (D50) of 16.4 μm in a jet mill method. The prepared crystalline graphite powder particles were used with petroleum pitch (carbon yield: 63 mass %), which is an amorphous or semi-crystalline carbon precursor, according to the same mass ratio and process as in Example 1, preparing composite particles having an average particle diameter (D50) of 16 μm. The composite particles included the amorphous or semi-crystalline carbon and the crystalline graphite powder particles in a mass ratio of 3:7.

These composite particles were used as a negative active material.

Example 7

Fine crystalline graphite powder particles having an average particle diameter (D50) of 1.8 μm were prepared by separating or pulverizing earthy graphite having an average particle diameter (D50) of 16.4 μm in a jet mill method. The crystalline graphite powder particles were mixed with petroleum pitch (carbon yield: 63 mass %), which is an amorphous or semi-crystalline carbon precursor, and then assembled into a spherical shape, preparing composite particles having an average particle diameter (D50) of 4.6 μm. The composite particles were heat-treated at 1200° C. for 1 hour under an argon atmosphere in order to carbonize the amorphous or semi-crystalline carbon precursor. The composite particles included the amorphous or semi-crystalline carbon and the crystalline graphite powder particles in a mass ratio of 3:7.

These composite particles were used as a negative active material.

Comparative Example 1

Graphite particles assembled into a spherical shape by using flake natural graphite were used as a negative active material. The graphite particles are commercially available and currently used as a negative active material. The graphite particles assembled into a spherical shape by using flake natural graphite had an average particle diameter (D50) of 17 μm.

Comparative Example 2

Amorphous graphite having an average particle diameter (D50) of 19.9 μm was used with petroleum pitch (carbon yield: 63 mass %), which is an amorphous or semi-crystalline carbon precursor, preparing composite particles having an average particle diameter (D50) of 16 μm according to the same mass ratio and process as in Example 1. The composite particles included the amorphous or semi-crystalline carbon and the crystalline graphite powder particles in a mass ratio of 3:7.

These composite particles were used as a negative active material.

Comparative Example 3

Amorphous graphite having an average particle diameter (D50) of 16.4 μm was pulverized in a jet mill method, preparing fine crystalline graphite powder particles having an average particle diameter (D50) of 3.6 μm. The crystalline graphite powder particles were used with petroleum pitch (carbon yield: 63 mass %), which is an amorphous or semi-crystalline carbon precursor, to prepare composite particles having an average particle diameter (D50) of 16 μm according to the same mass ratio and process as in Example 1. The composite particles included the amorphous or semi-crystalline carbon and the crystalline graphite powder particles in a mass ratio of 3:7.

The composite particles were used as a negative active material.

Comparative Example 4

Amorphous graphite having an average particle diameter (D50) of 16.4 μm was pulverized in a jet mill method, preparing fine crystalline graphite powder particles having an average particle diameter (D50) of 4.6 μm. The crystalline graphite powder particles were used with petroleum pitch (carbon yield: 63 mass %), which is an amorphous or semi-crystalline carbon precursor, to prepare composite particles having an average particle diameter (D50) of 16 μm according to the same mass ratio and process as in Example 1. The composite particles included the amorphous or semi-crystalline carbon and the crystalline graphite powder particles in a mass ratio of 3:7.

These composite particles were used as a negative active material.

Comparative Example 5

Earthy graphite having an average particle diameter (D50) of 16.4 μm was pulverized in a jet mill method, preparing fine crystalline graphite powder particles having an average particle diameter (D50) of 5.8 μm. The crystalline graphite powder particles were used with petroleum pitch (carbon yield: 63 mass %), which is an amorphous or semi-crystalline carbon precursor, in order to prepare composite particles having an average particle diameter (D50) of 16 μm according to the same mass ratio and process as in Example 1. The composite particles included the amorphous or semi-crystalline carbon and the crystalline graphite powder particles in a mass ratio of 3:7.

These composite particles were used as a negative active material.

Comparative Example 6

Amorphous graphite having an average particle diameter (D50) of 16.4 μm was pulverized in a jet mill method, preparing fine crystalline graphite powder particles having an average particle diameter (D50) of 6.9 μm. The crystalline graphite powder particles were used with petroleum pitch (carbon yield: 63 mass %), which is an amorphous or semi-crystalline carbon precursor, in order to prepare composite particles having an average particle diameter (D50) of 16 μm according to the same mass ratio and process as in Example 1. The composite particles included the amorphous or semi-crystalline carbon and the crystalline graphite powder particles in a mass ratio of 3:7.

These composite particles were used as a negative active material.

Experimental Example 1

Scanning Electron Microscope (SEM) Photograph Analysis

Scanning Electron Microscope Analysis According to Example 1

In order to examine particle shape change due to separation or pulverization in the jet mill process, earthy graphite before separation or pulverization or separated or pulverized crystalline graphite powder particles according to Example 1 were observed using a scanning electron microscope (SEM). The results are provided in FIGS. 3 and 4.

Figure 3:
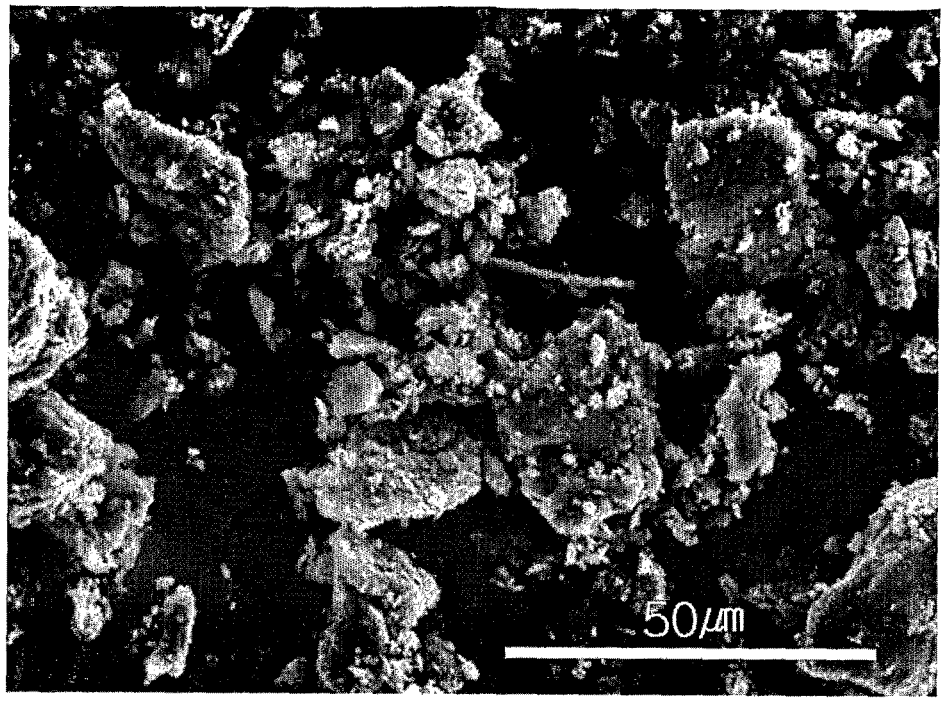
FIG. 3 is a scanning electron microscope photograph of the earthy graphite before pulverizing according to Example 1.
Figure 4:
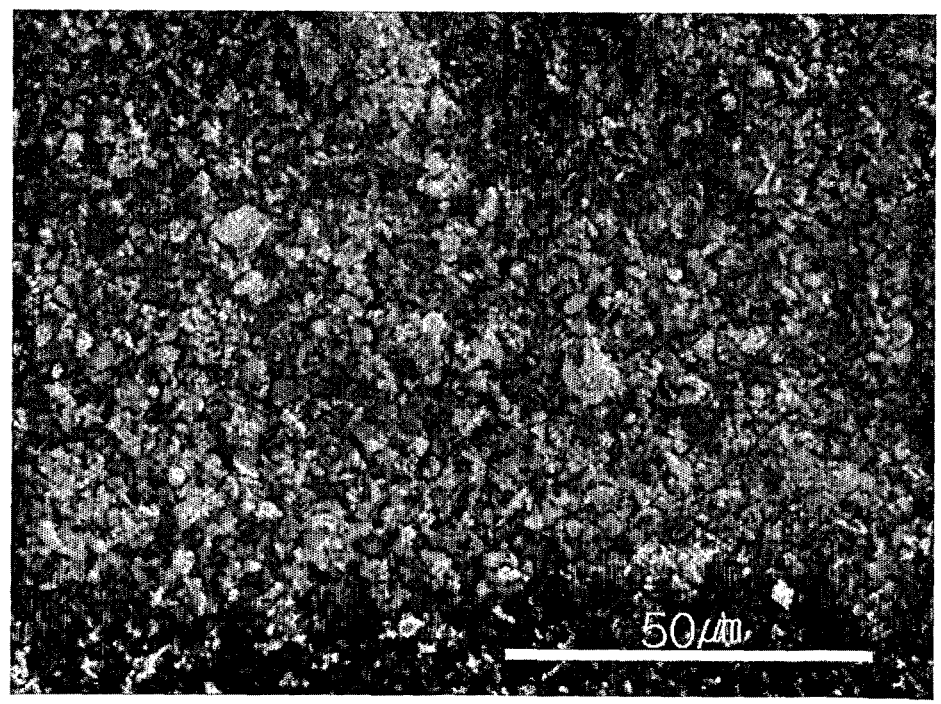
FIG. 4 is a scanning electron microscope photograph of the earthy graphite after pulverizing according to Example 1.

FIG. 3 is a scanning electron microscope photograph of amorphous graphite before separation or pulverization according to Example 1, and FIG. 4 is a scanning electron microscope photograph of crystalline graphite powder particles after separation or pulverization according to Example 1. Referring to FIGS. 3 and 4, crystalline graphite powder particles that were separated or pulverized from earthy graphite turned out to become smaller.

Figure 5:
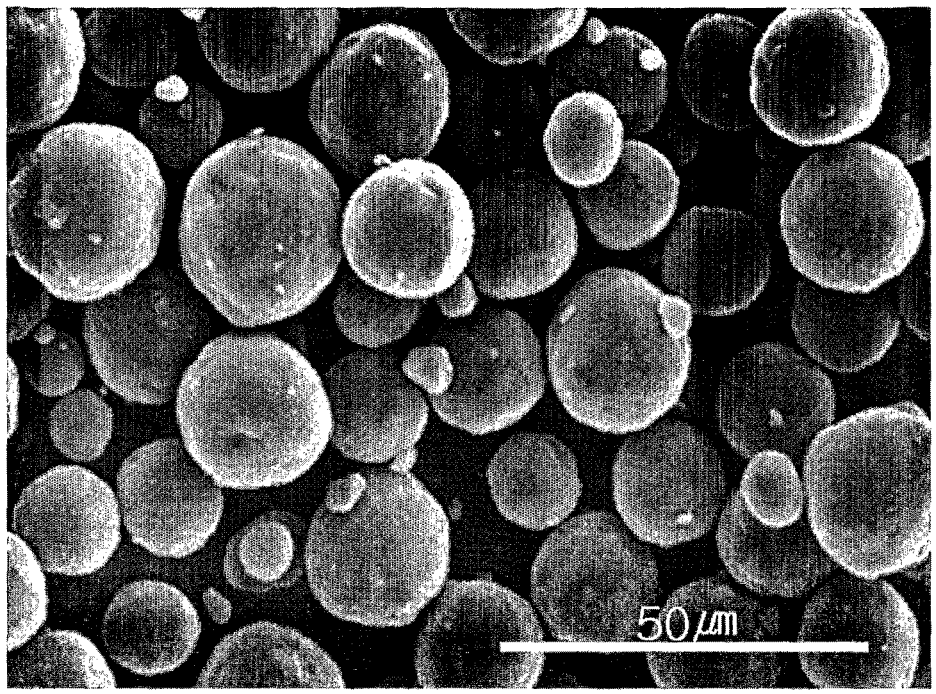
FIG. 5 is a scanning electron microscope photograph of the composite particles according to Example 1.

In addition, FIG. 5 shows measurements of the composite particles according to Example 1 using a scanning electron microscope (SEM).

That is, FIG. 5 provides a scanning electron microscope photograph of the composite particle according to Example 1. Referring to FIG. 5, the composite particles assembled with crystalline graphite powder particles and amorphous or semi-crystalline carbon had a spherical shape.

(1-2) Scanning Electron Microscope Analysis of Comparative Example 1

The graphite particles assembled into a spherical shape using flake natural graphite according to Comparative Example 1 were measured with a scanning electron microscope (SEM). The results are provided in FIGS. 6 and 7.

Figure 6:
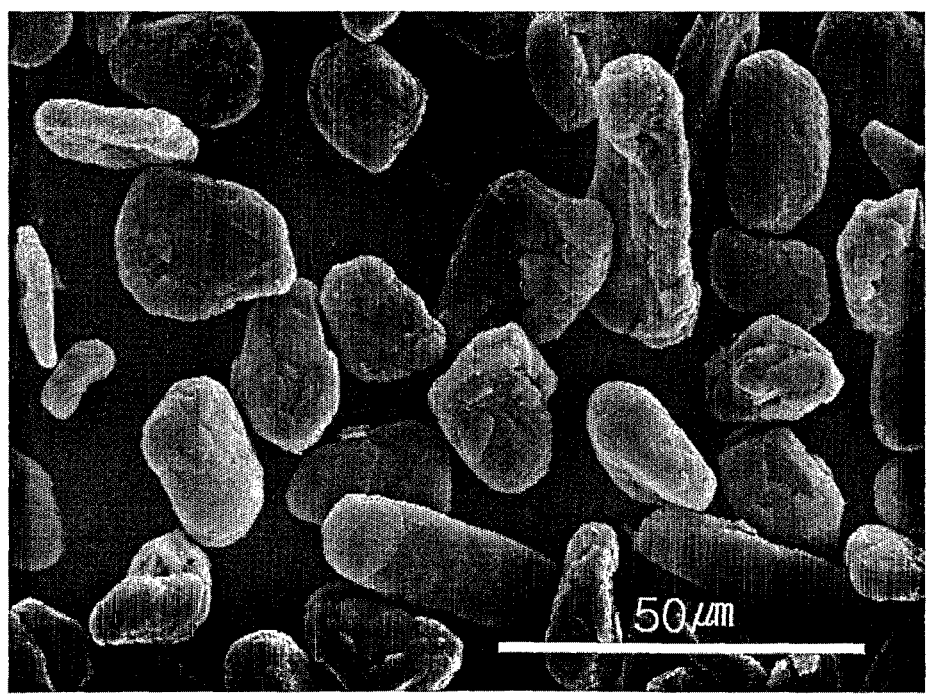
FIG. 6 is a scanning electron microscope photograph of the assembled graphite particles using flake natural graphite into a spherical shape according to Comparative Example 1.
Figure 7:
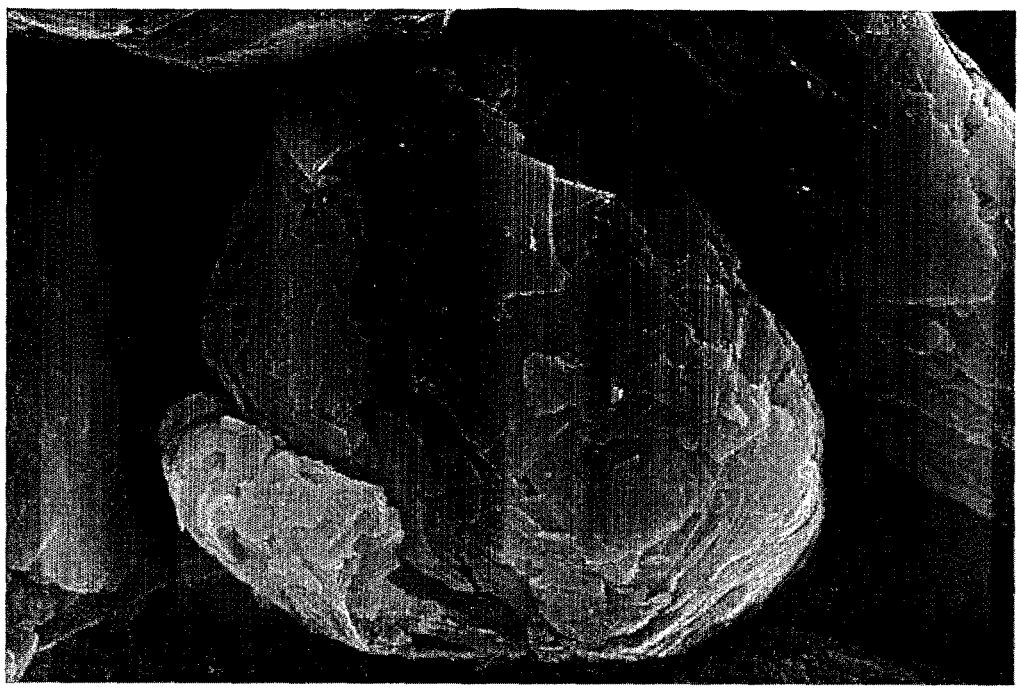
FIG. 7 is a high magnification scanning electron microscope photograph of the assembled graphite particles using flake natural graphite into a spherical shape according to Comparative Example 1.

FIG. 6 is a SEM photograph of the graphite particles assembled into a spherical shape using flake natural graphite according to Comparative Example 1, and FIG. 7 is a highly-enlarged SEM photograph of the graphite particles assembled into a spherical shape using flake natural graphite according to Comparative Example 1. Referring to FIGS. 6 and 7, the flake natural graphite used for forming the graphite particles assembled into a spherical shape in Comparative Example 1 had a large size compared with the crystalline graphite powder particles (referring to FIG. 4) according to one embodiment.

(1-3) Scanning Electron Microscope Analysis According to Comparative Example 2

Comparative Example 2 included earthy graphite before separation or pulverization compared with Example 1. The earthy graphite according to Comparative Example 2 may be referred to with the scanning electron microscope photograph of the earthy graphite before separation or pulverization shown in FIG. 3.

Experimental Example 2

Analysis of a Particle Diameter Analysis Graph (2-1) Analysis of Particle Diameter Analysis Graph According to Example 1

Figure 8:
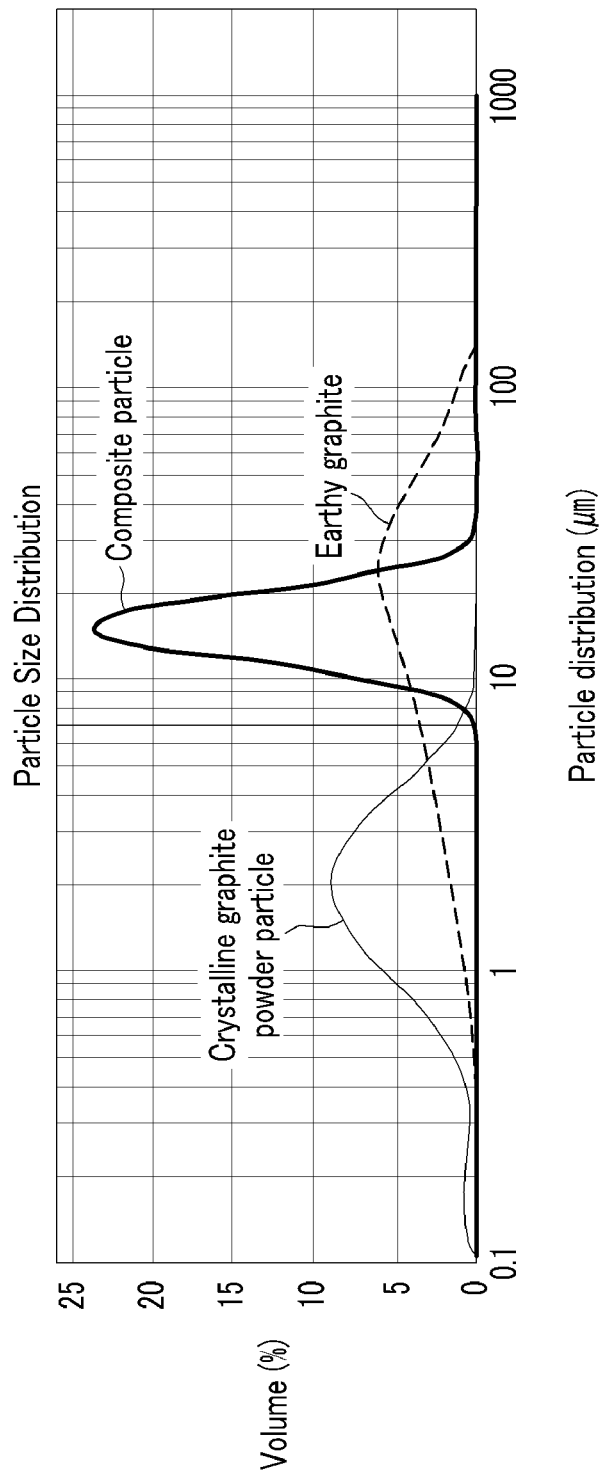
FIG. 8 is a particle analysis graph of the crystalline graphite powder particles and composite particles according to Example 1.

The crystalline graphite powder particles separated or pulverized from earthy graphite and composite particles assembled therefrom according to Example 1 were measured regarding size by using a particle diameter analyzer. FIG. 8 shows the results.

FIG. 8 is an analysis graph showing particle diameter of the crystalline graphite powder particles and the composite particles according to Example 1. Referring to FIG. 8, the crystalline graphite powder particles pulverized from earthy graphite had an average particle diameter of about 1.8 μm, which is very fine. The composite particles assembled from the crystalline graphite powder particles and amorphous or semi-crystalline carbon had an average particle diameter of about 16 μm.

(2-2) Analysis of Particle Diameter Analysis Graph According to Examples 4 to 6

The crystalline graphite powder particles according to Examples 4 to 6 were measured regarding particle diameter by using a particle diameter analyzer. The results are respectively provided in FIGS. 9 to 11.

Figure 9:
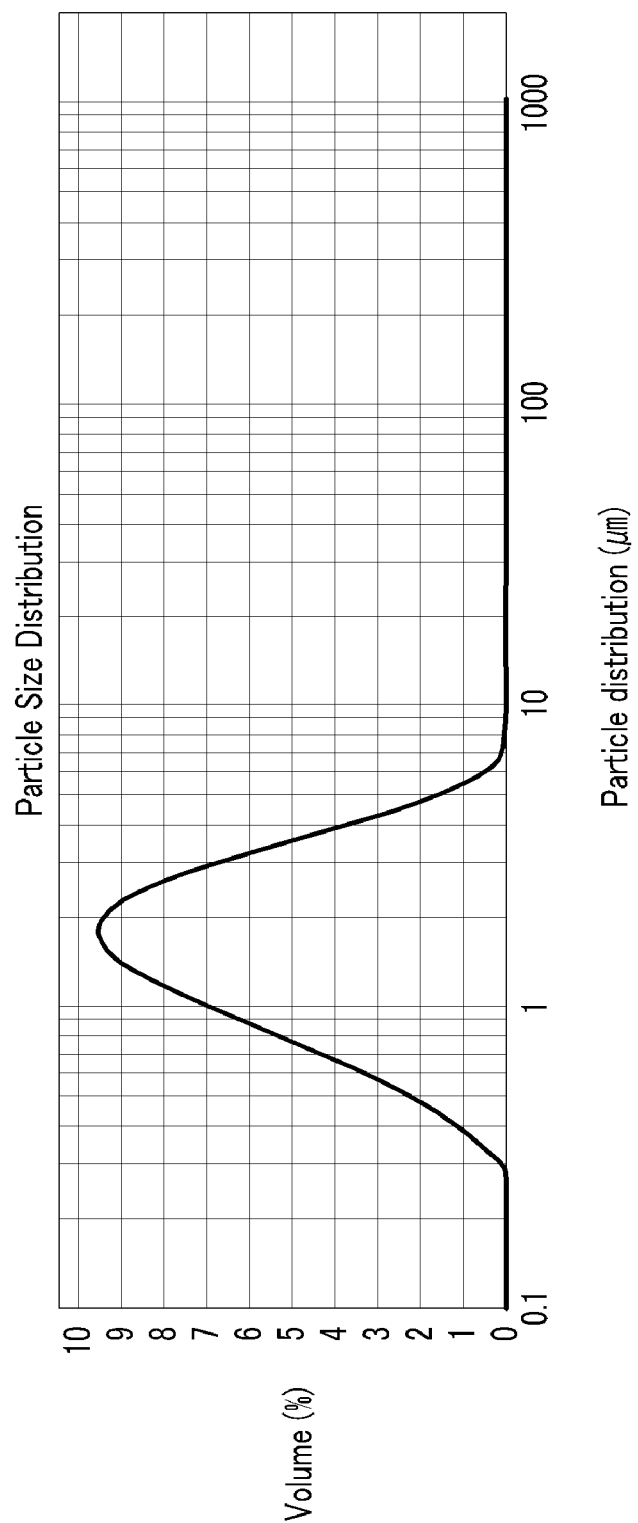
FIGS. 9 to 11 are particle analysis graphs of the crystalline graphite powder particles according to Examples 4 to 6, respectively.
Figure 10:
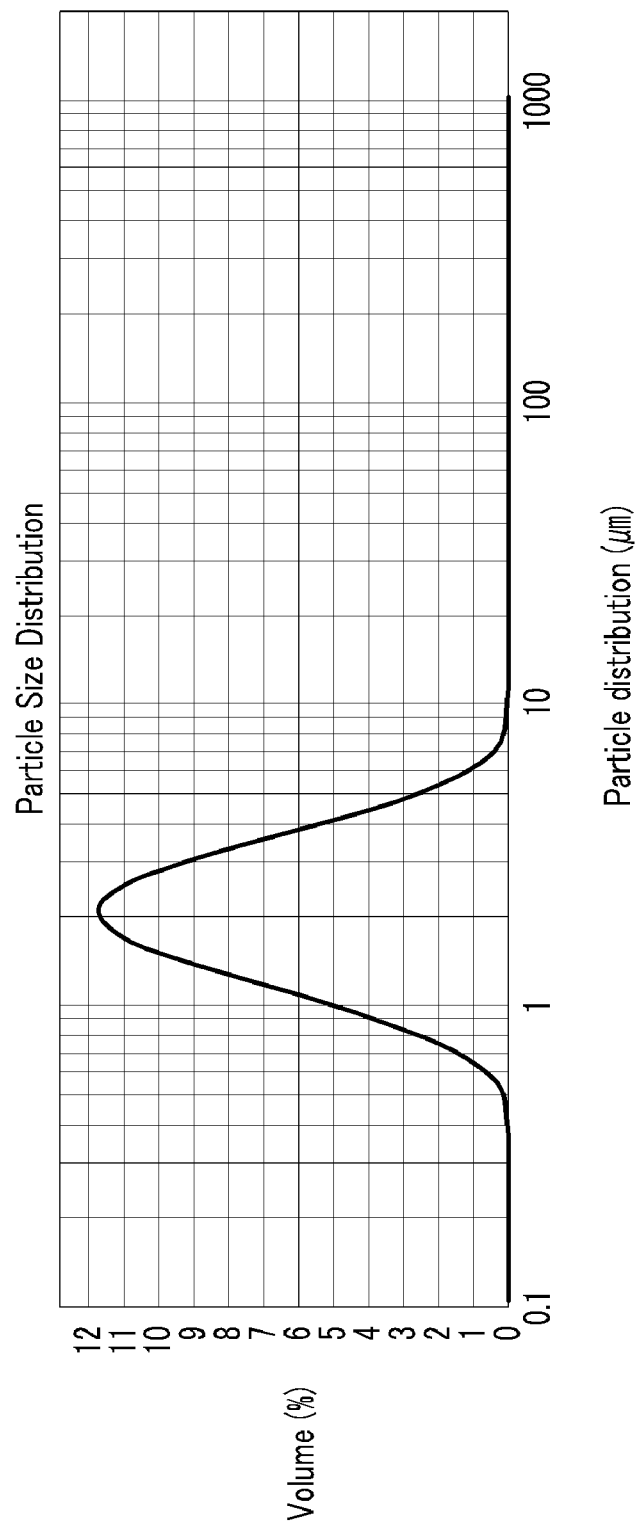
Figure 11:
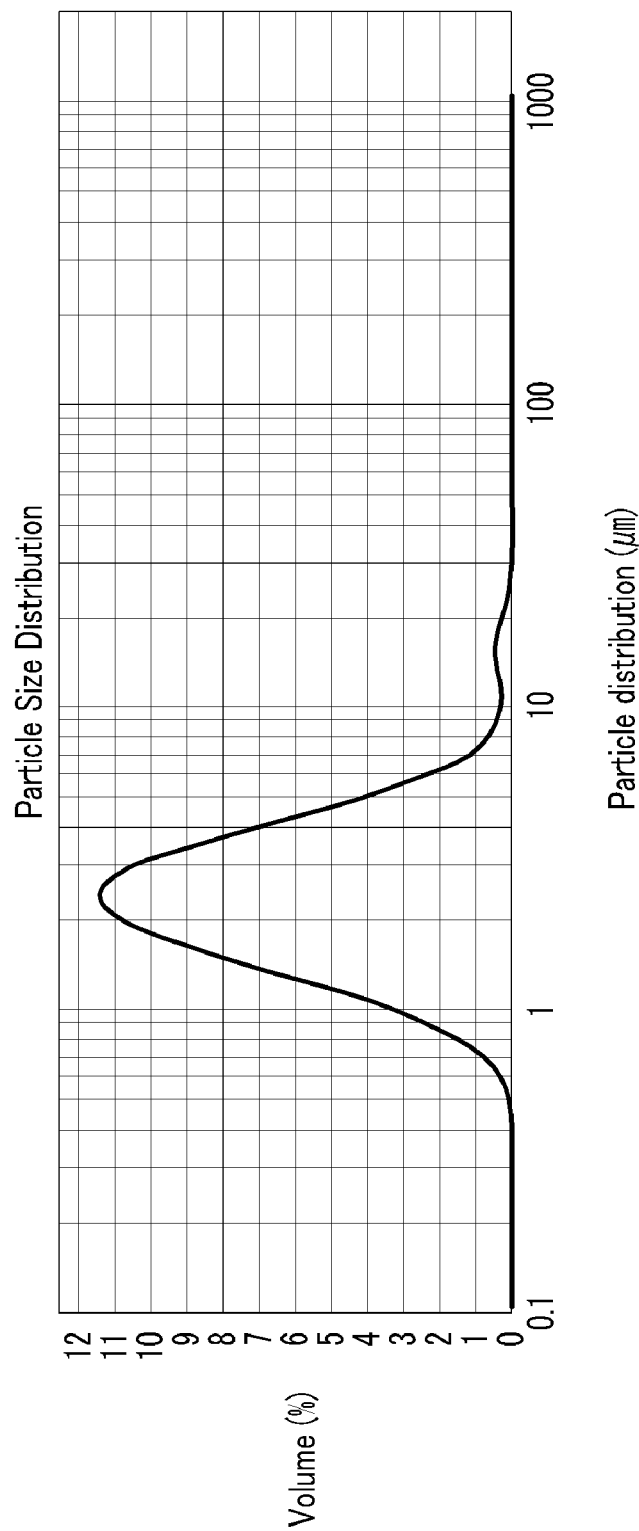

FIGS. 9 to 11 are respectively a particle diameter analysis graph of the crystalline graphite powder particles according to Examples 4 to 6. Referring to FIGS. 9 to 11, the crystalline graphite powder particles separated or pulverized from earthy graphite had an average particle diameter of respectively 1.6 μm, 2.1 μm, and 2.4 μm, which are very fine.

(2-3) Analysis of Particle Diameter Analysis Graph According to Comparative Example 1

The size of a graphite particles assembled into a spherical shape using flake natural graphite according to Comparative Example 1 was measured with a particle diameter analyzer. The result is provided in FIG. 12.

Figure 12:
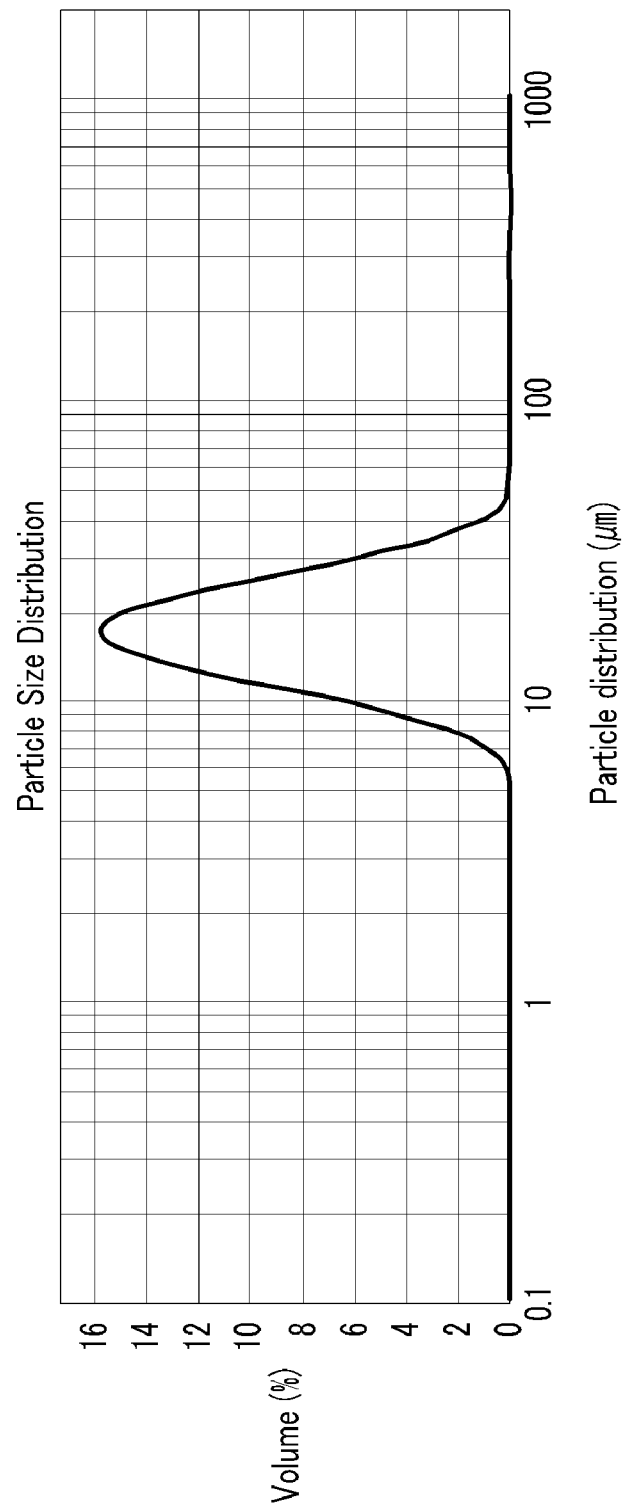
FIG. 12 is a particle analysis graph of the graphite particles that are assembled into a spherical shape using flake natural graphite according to Comparative Example 1.

FIG. 12 is a diameter analysis graph of the graphite particles assembled into a spherical shape using flake natural graphite according to Comparative Example 1. Referring to FIG. 12, the graphite particles assembled into a spherical shape using flake natural graphite had an average particle diameter of about 17 μm, which is similar to an average particle diameter of composite particles assembled into a spherical shape using crystalline graphite powder particles (referring to FIG. 8).

(2-4) Analysis of Average Particle Diameter Graph Analysis According to Comparative Example 2

Earthy graphite according to Comparative Example 2 was measured regarding size using a particle diameter analyzer. The result is given in FIG. 13.

Figure 13:
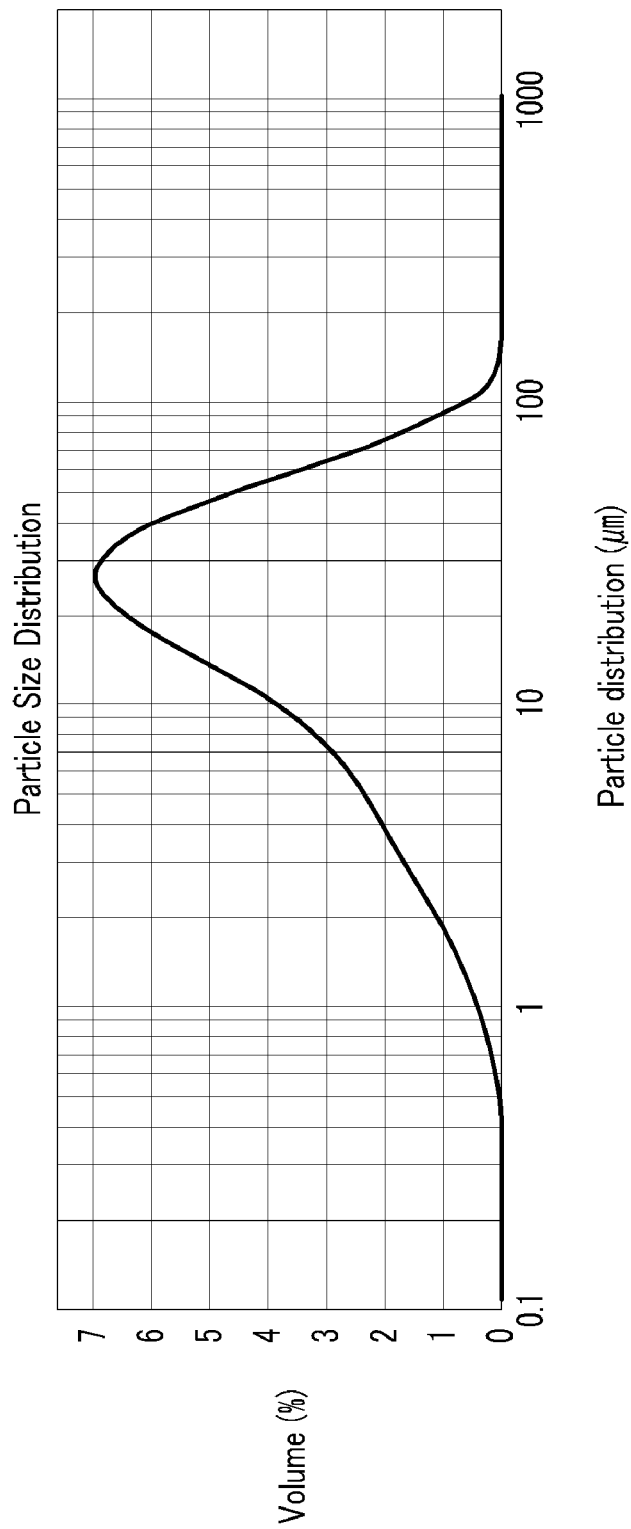
FIG. 13 is a particle analysis graph of the earthy graphite according to Comparative Example 2.
Figure 14:
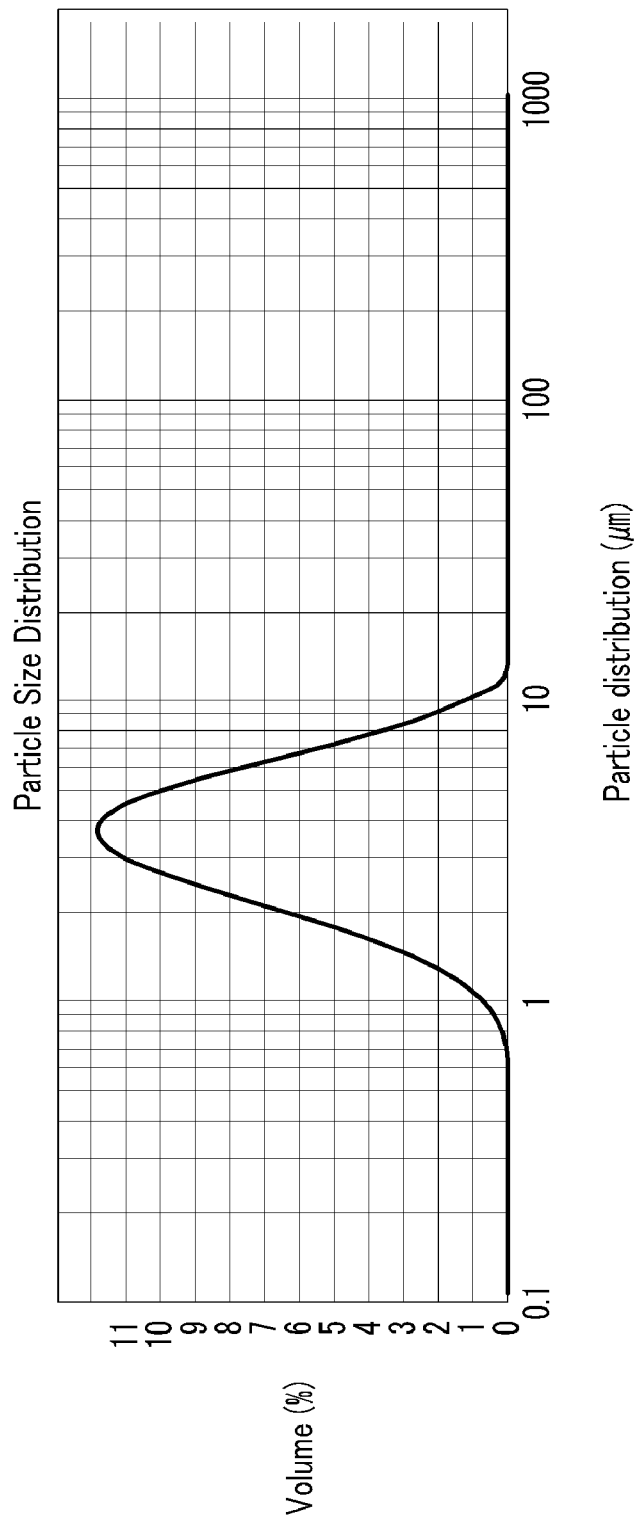
FIGS. 14 to 17 are particle analysis graphs of the crystalline graphite powder particles according to Comparative Examples 3 to 6, respectively.
Figure 15:
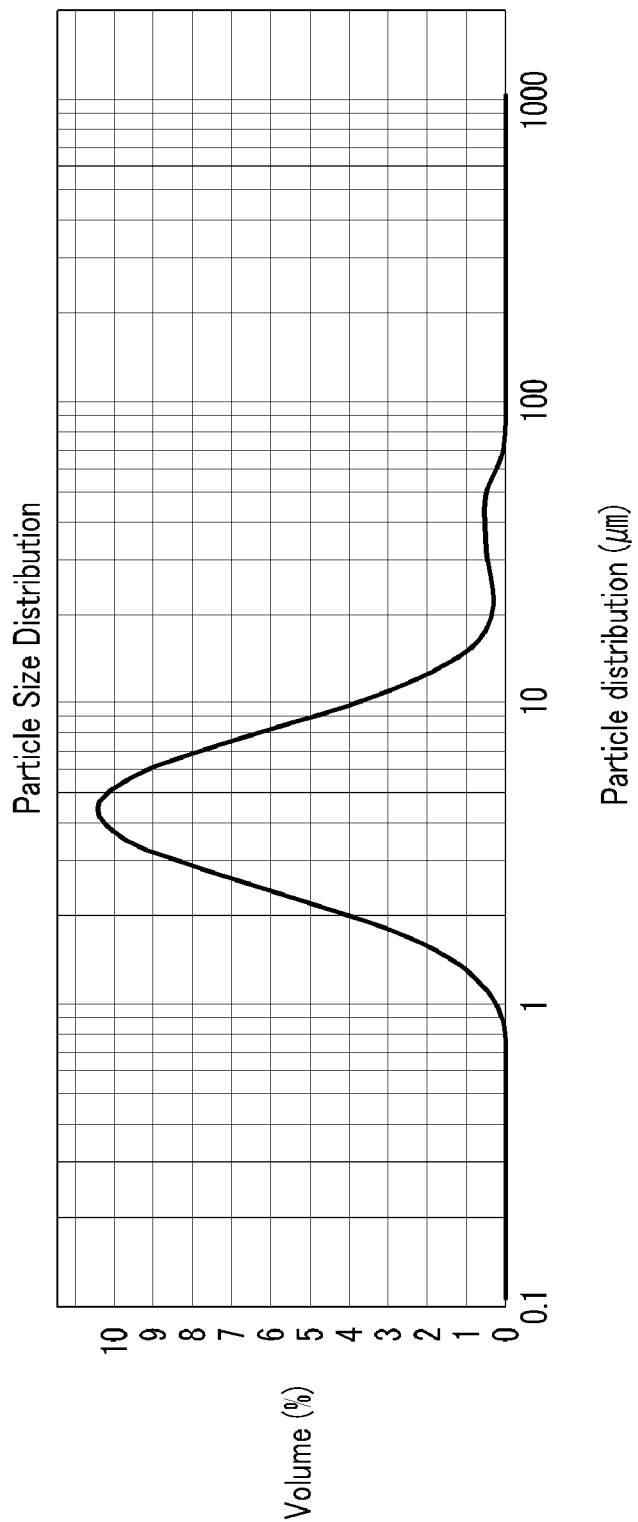
Figure 16:
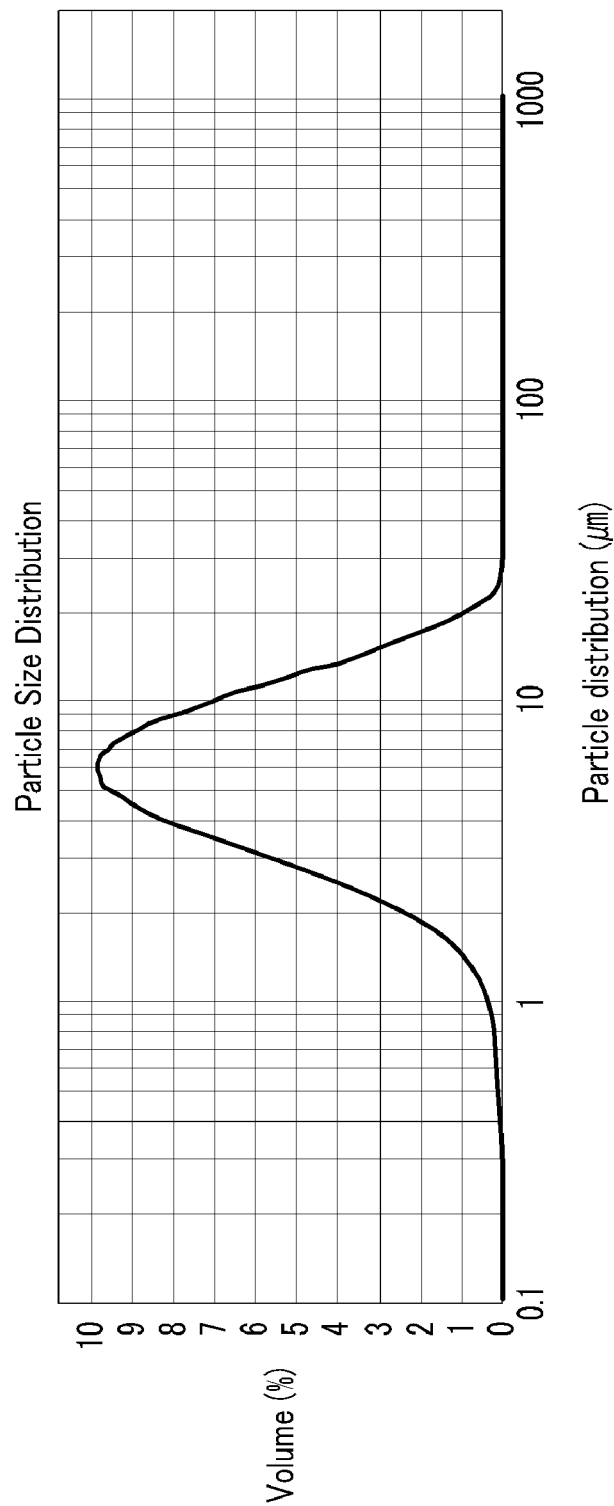
Figure 17:
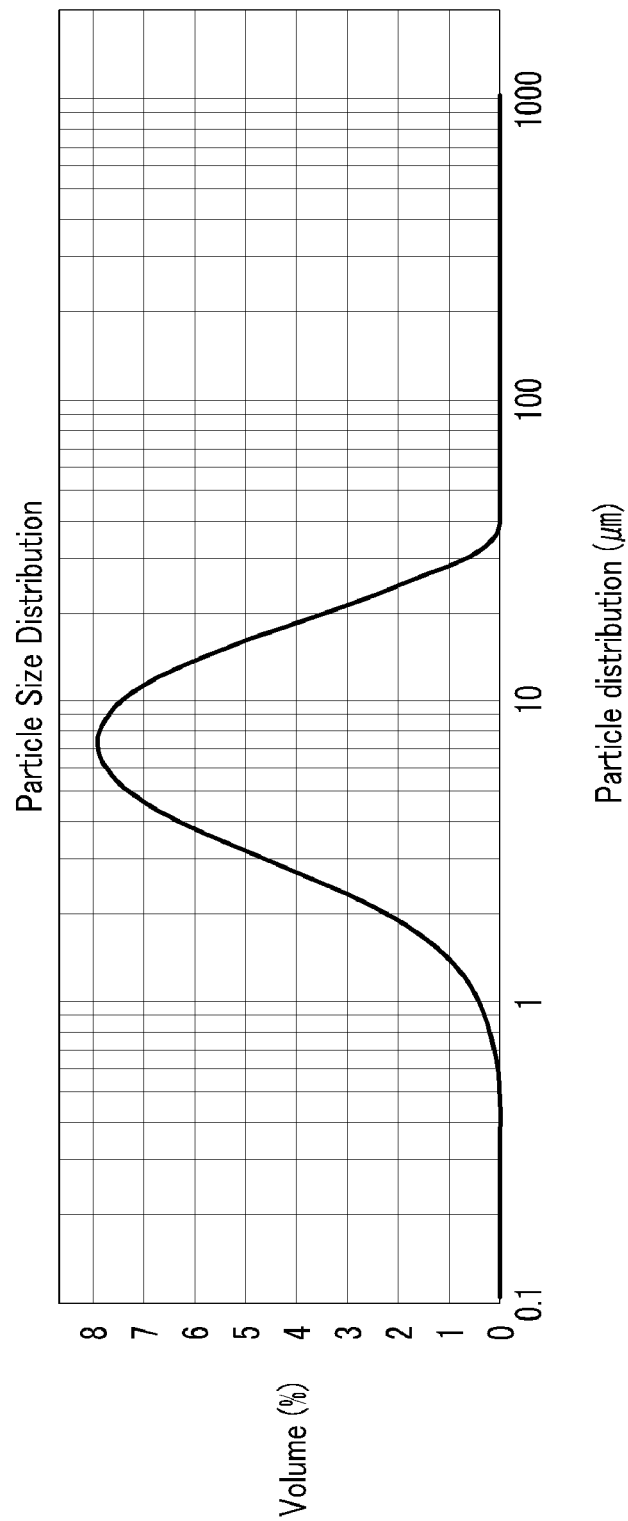

FIG. 13 is an average particle diameter analysis graph of earthy graphite according to Comparative Example 2 Referring to FIG. 13, the amorphous graphite had an average particle diameter of 19.9 μm. It should have a larger size before separation or pulverization.

(2-5) Analysis of an Average Particle Diameter Analysis Graph According to Comparative Examples 3 to 6

The crystalline graphite powder particles according to Comparative Examples 3 to 6 were measured regarding size. The results are respectively provided in FIGS. 14 to 17.

FIGS. 14 to 17 are respectively an average particle diameter analysis graph of the crystalline graphite powder particles according to Comparative Example 3 to 6.

Referring to FIGS. 14 to 17, the crystalline graphite powder particles separated or pulverized from earthy graphite had an average particle diameter of respectively 3.6 μm, 4.6 μm, 5.8 μm, and 6.9 μm, which is larger than the average particle diameter of the crystalline graphite powder according to Example 1 (Referring to FIG. 5).

Experimental Example 3

X-Ray Diffraction Pattern Analysis (3-1) X-Ray Diffraction Pattern Analysis According to Example 1

In order to examine the crystal status of the crystalline graphite powder particle after separation or pulverization according to Example 1, it was measured using an X-ray diffraction analyzer. The result is provided in FIG. 18.

Figure 18:
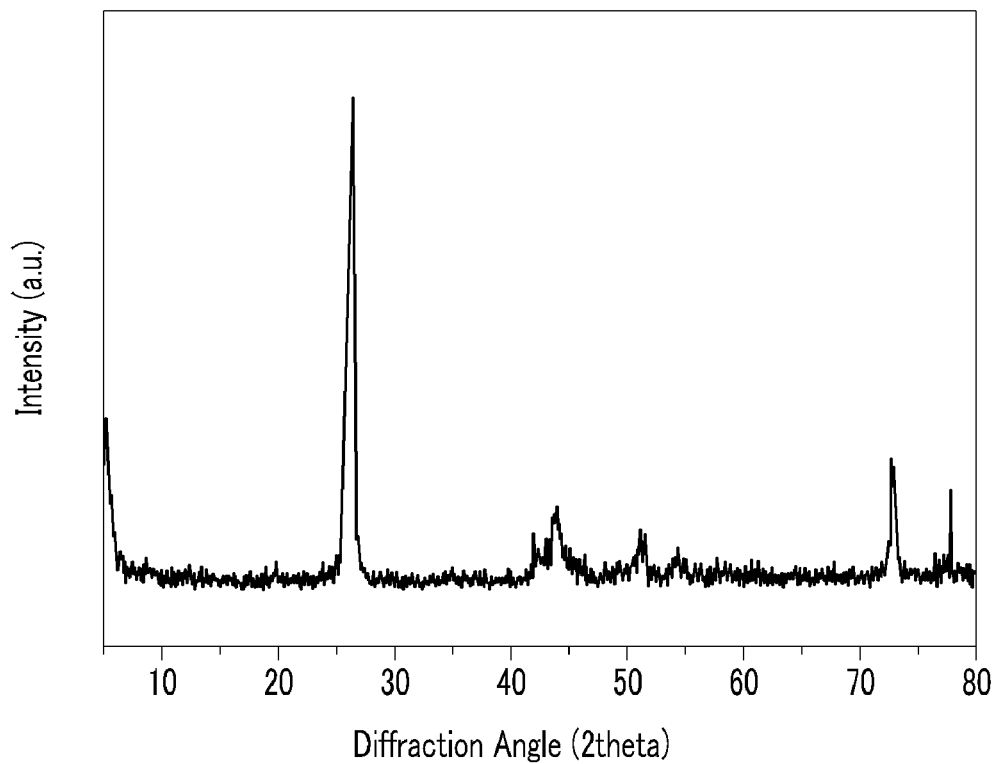
FIG. 18 is an X-ray diffraction pattern of the crystalline graphite powder particles according to Example 1.

FIG. 18 shows an X-ray diffraction pattern of the crystalline graphite powder particles according to Example 1. Referring to FIG. 18, it had a very strong 002 diffraction peak as a main peak after separation or pulverization, which means it maintained crystallinity.

(3-2) X-Ray Diffraction Pattern Analysis According to Comparative Example 1

In order to examine the crystal status of the natural graphite flake of Comparative Example 1, it was measured using an X-ray diffraction analyzer. The result is provided in FIG. 19.

Figure 19:
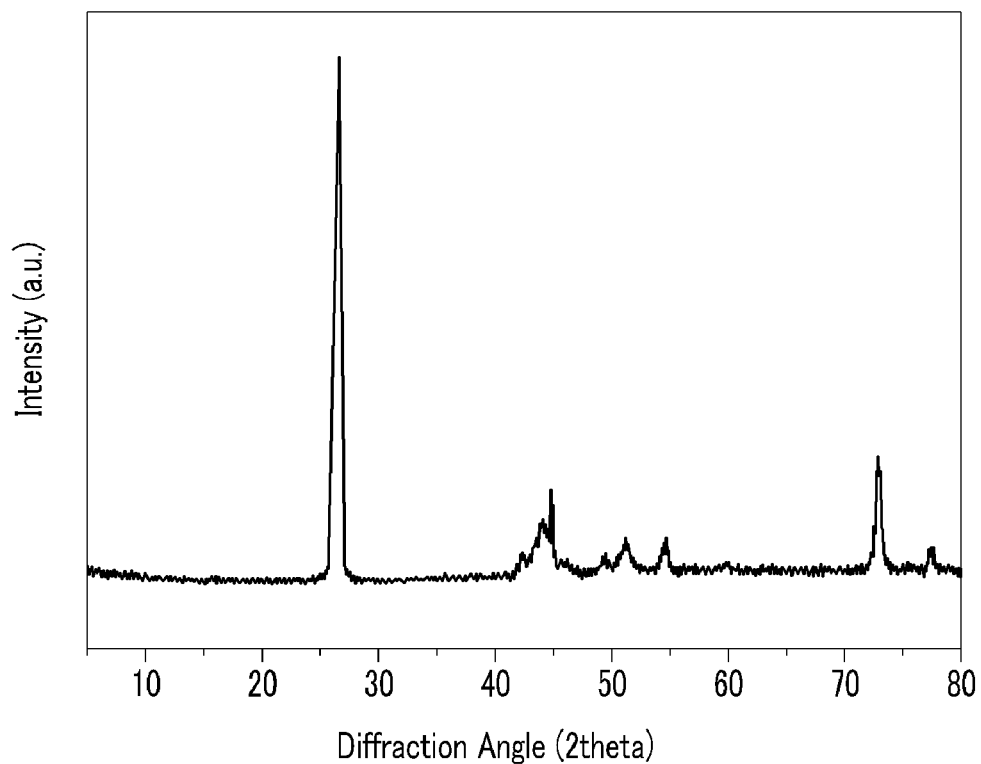
FIG. 19 is an X-ray diffraction pattern of the flaked natural graphite according to Comparative Example 1.

FIG. 19 shows an X-ray diffraction pattern of a natural graphite flake according to Comparative Example 1.

Referring to FIG. 19, it had a very strong 002 diffraction peak as a main peak, which means that it maintained crystallinity.

Experimental Example 4

Raman Spectrum Analysis (4-1) Raman Spectrum Analysis According to Example 1

In order to evaluate the crystal status of the crystalline graphite powder particles according to Example 1, they were measured using a Raman spectrum. The result is provided in FIG. 20.

Figure 20:
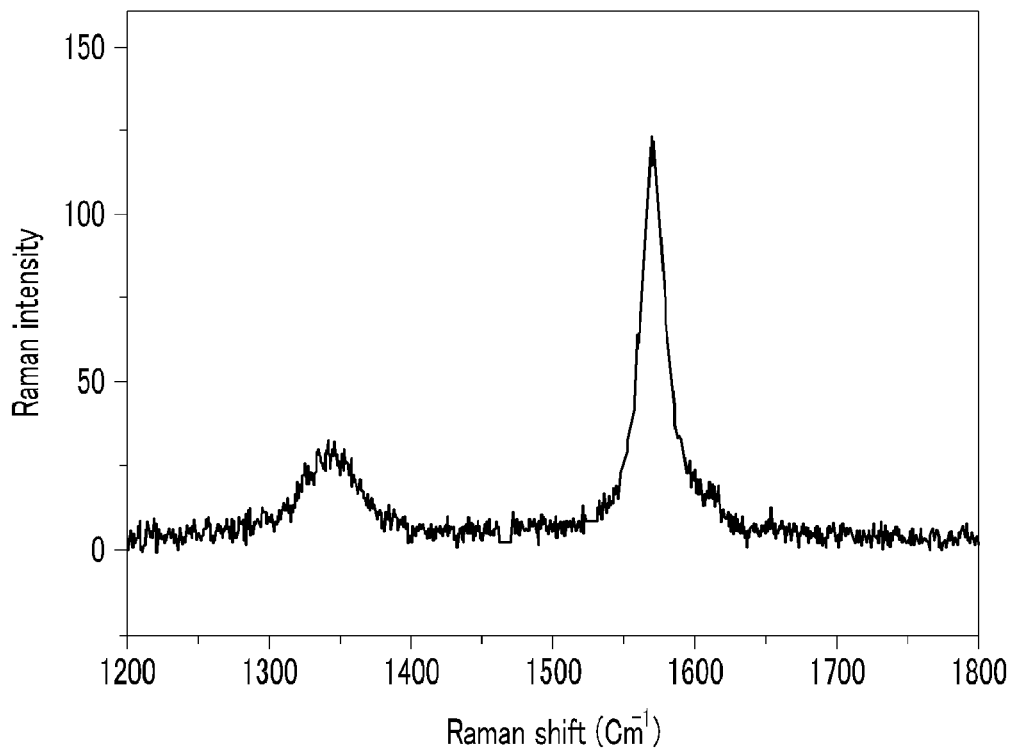
FIG. 20 is a Raman spectrum graph of the crystalline graphite powder particles according to Example 1.

FIG. 20 is a Raman spectrum graph of the crystalline graphite powder particles according to Example 1. Referring to FIG. 20, they had a ratio ($I_{1360}/I_{1580}$) of 1360 cm$^{-1}$ peak intensity ($I_{1360}$=40.9) against 1580 cm$^{-1}$ peak intensity ($I_{1580}$=143.6) of 0.28, and thereby maintained crystallinity after the jet mill process.

(4-2) Raman Spectrum Analysis According to Comparative Example 1

In order to evaluate the crystal status of the natural graphite flake according to Comparative Example 1, it was measured using a Raman spectrum. The result is provided in FIG. 21.

Figure 21:
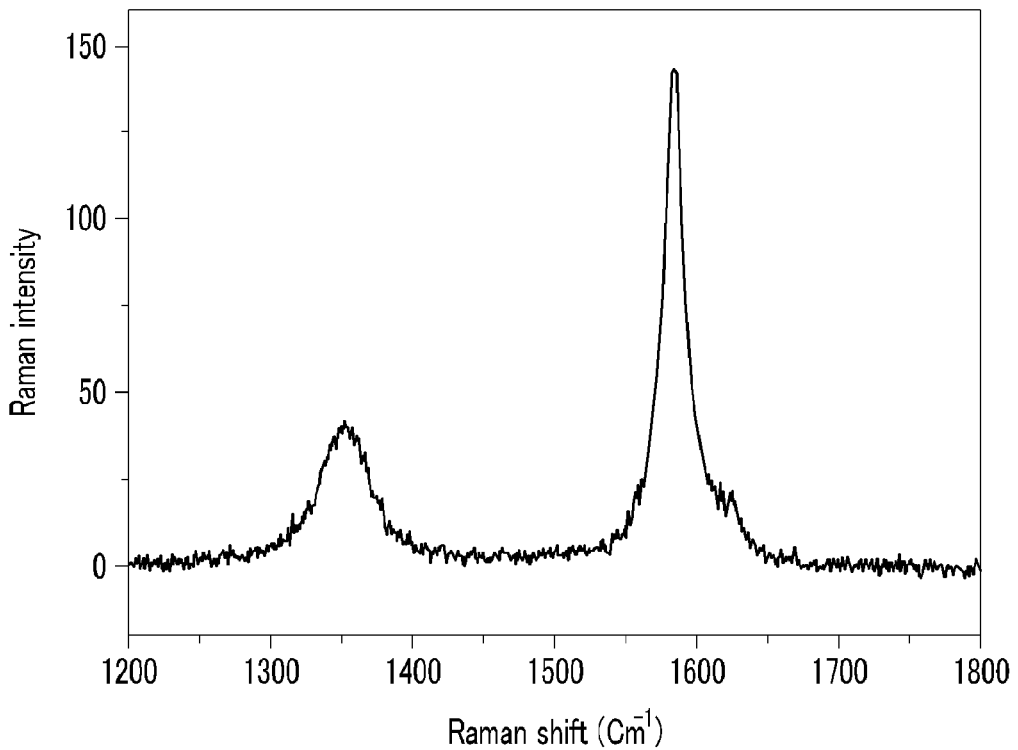
FIG. 21 is a Raman spectrum graph of the flake natural graphite according to Comparative Example 1.
Figure 22:
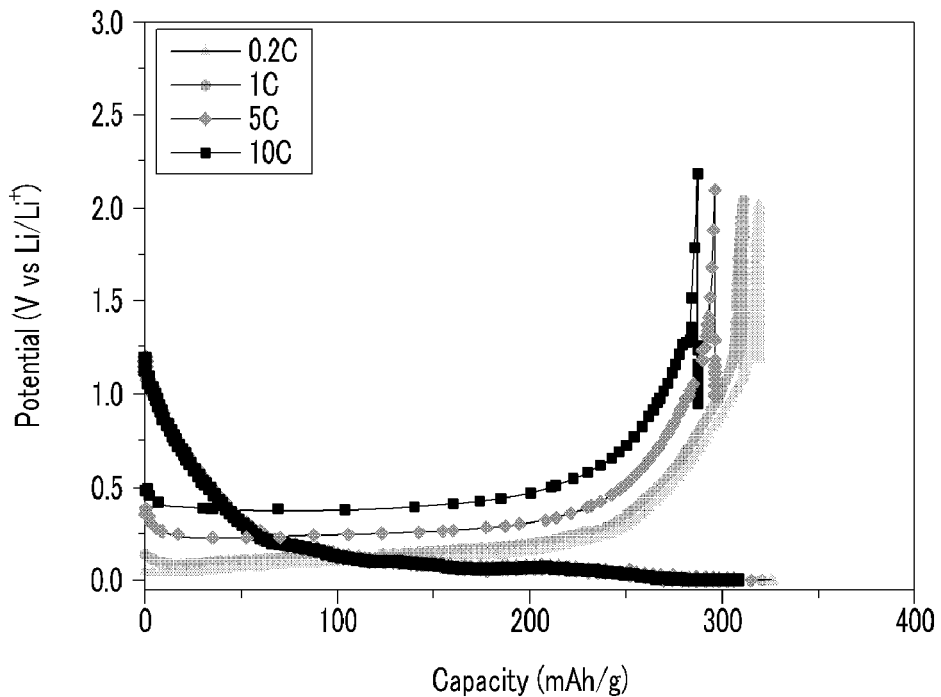
FIGS. 22 to 28 are graphs showing high-rate charge and discharge characteristics of half-cells according to Examples 1 to 7, respectively.
Figure 23:
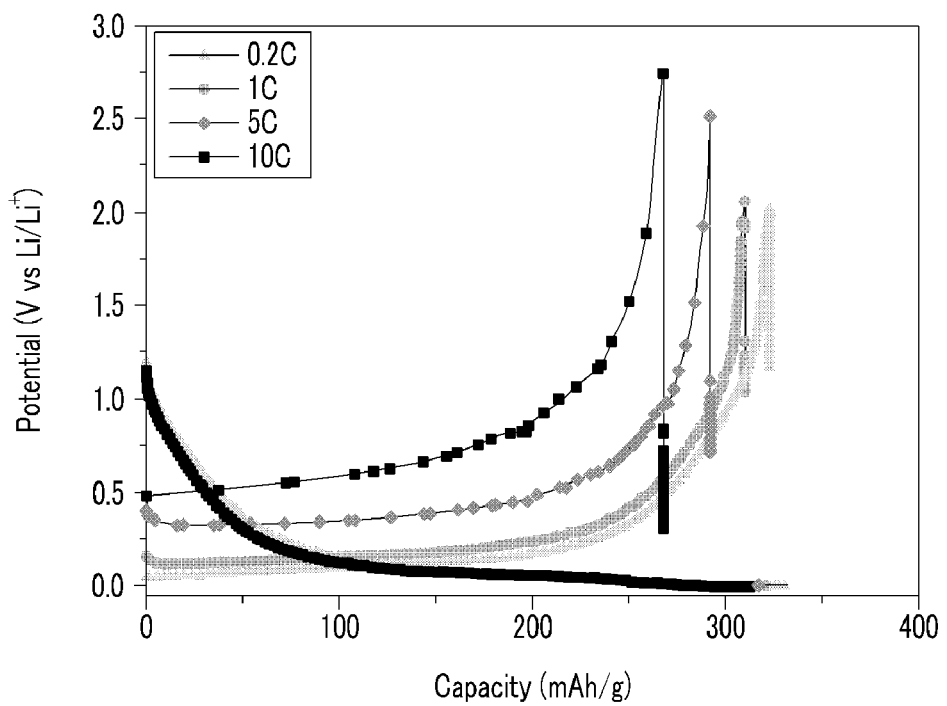
Figure 24:
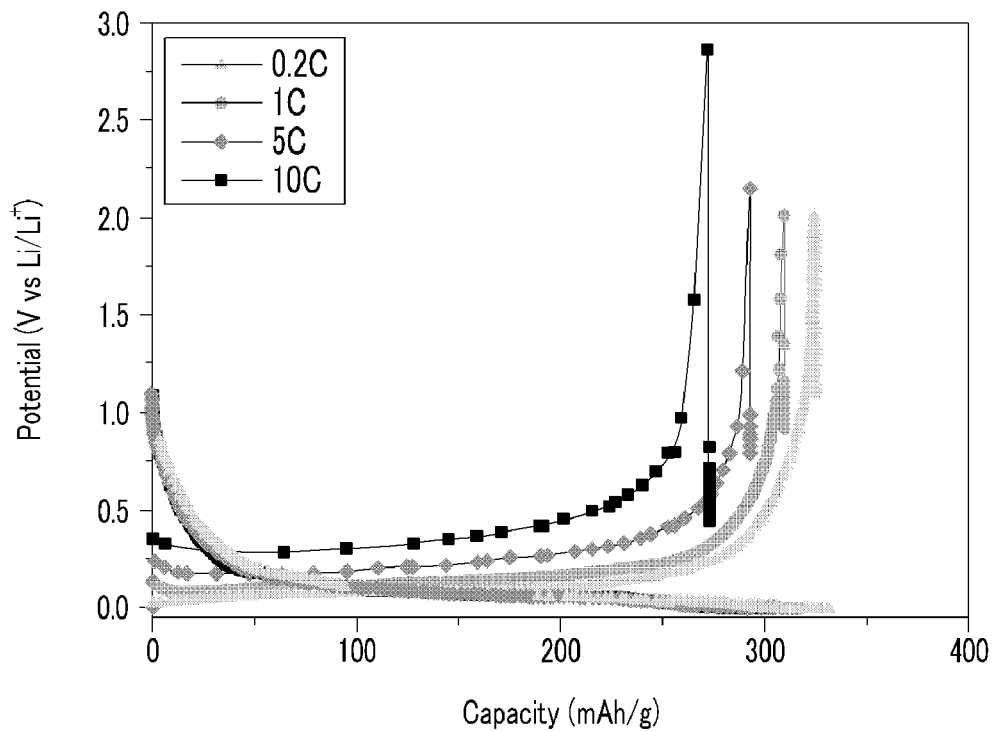
Figure 25:
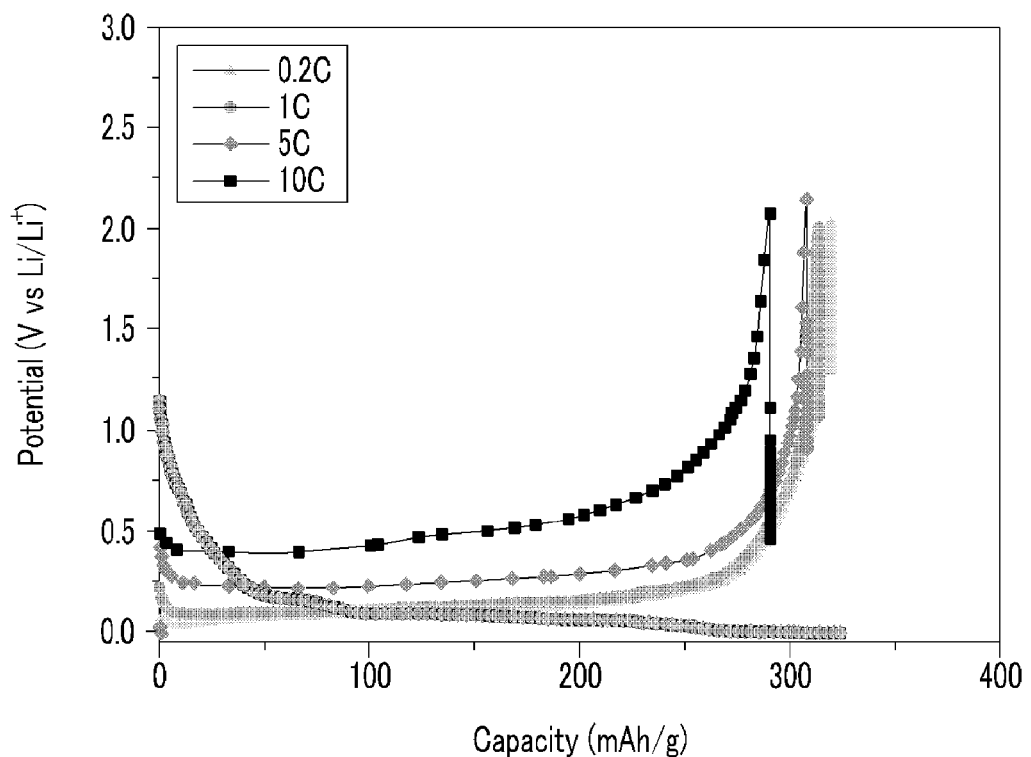
Figure 26:
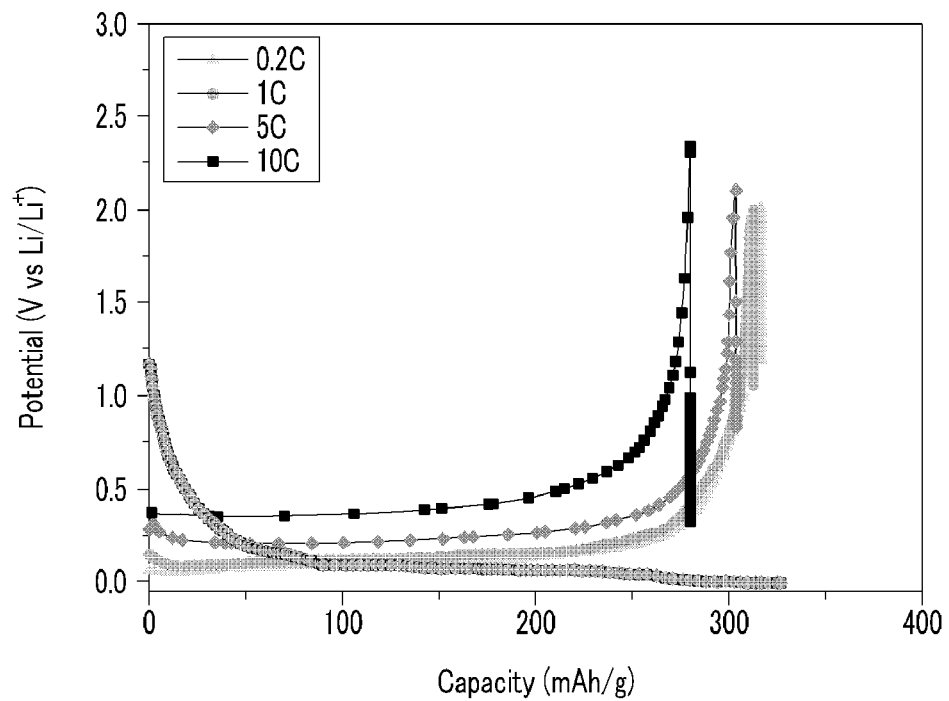
Figure 27:
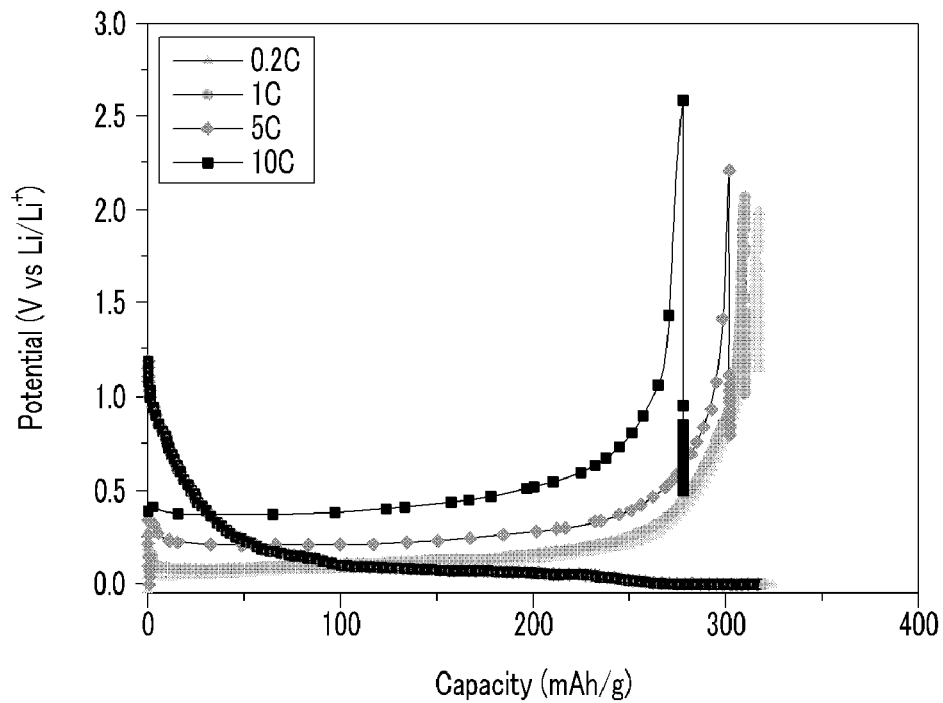
Figure 28:
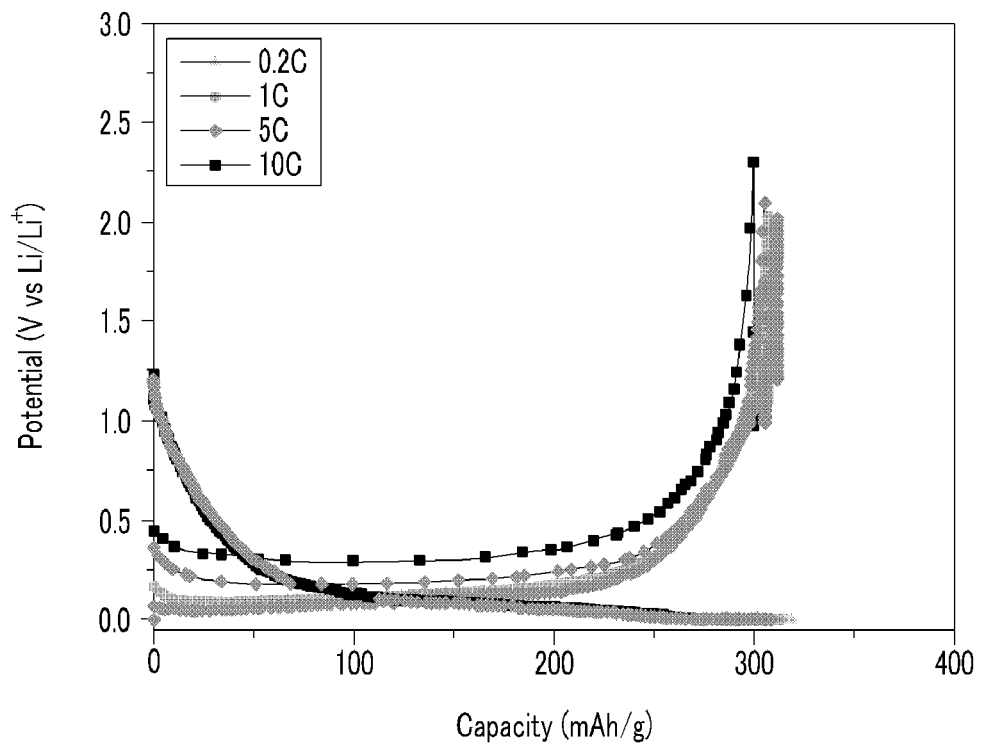
Figure 29:
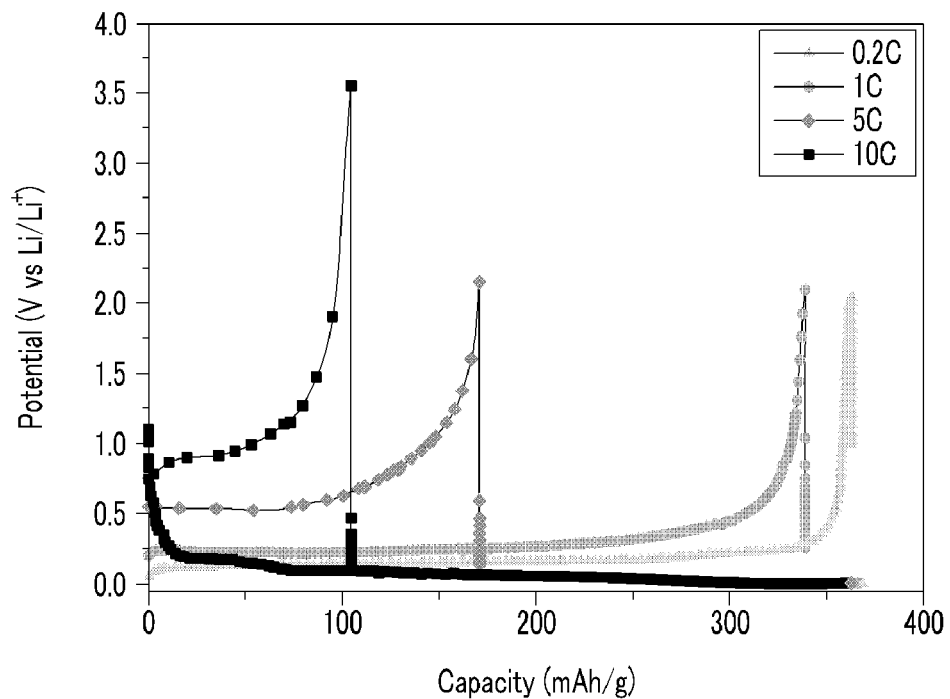
FIGS. 29 to 34 are graphs showing high-rate charge and discharge characteristics of half-cells according to Comparative Examples 1 to 6, respectively.
Figure 30:
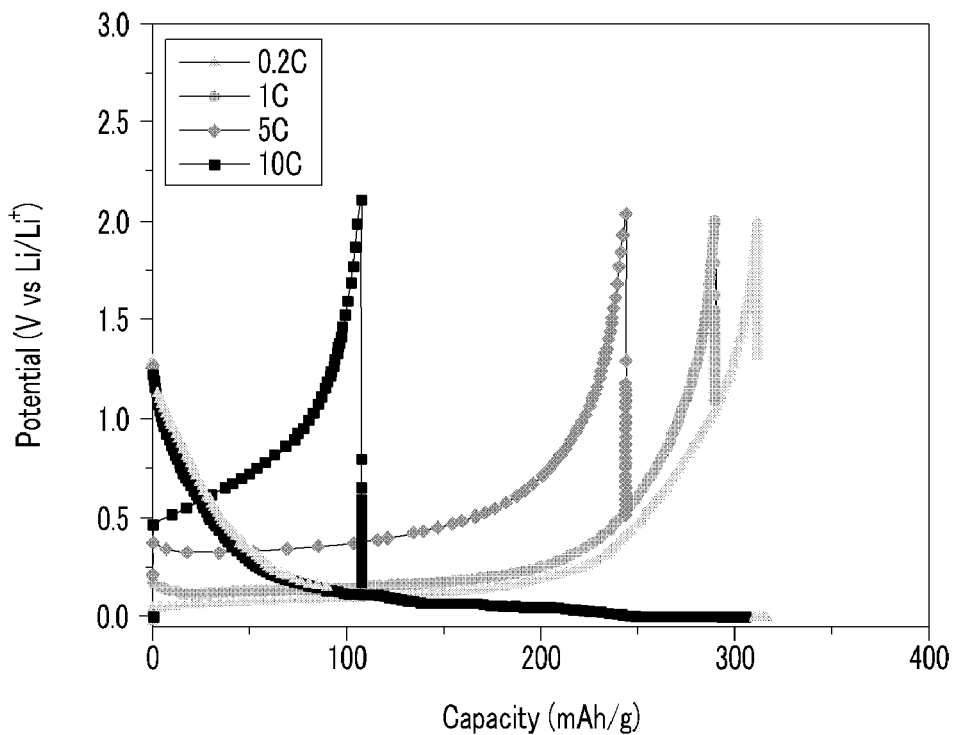
Figure 31:
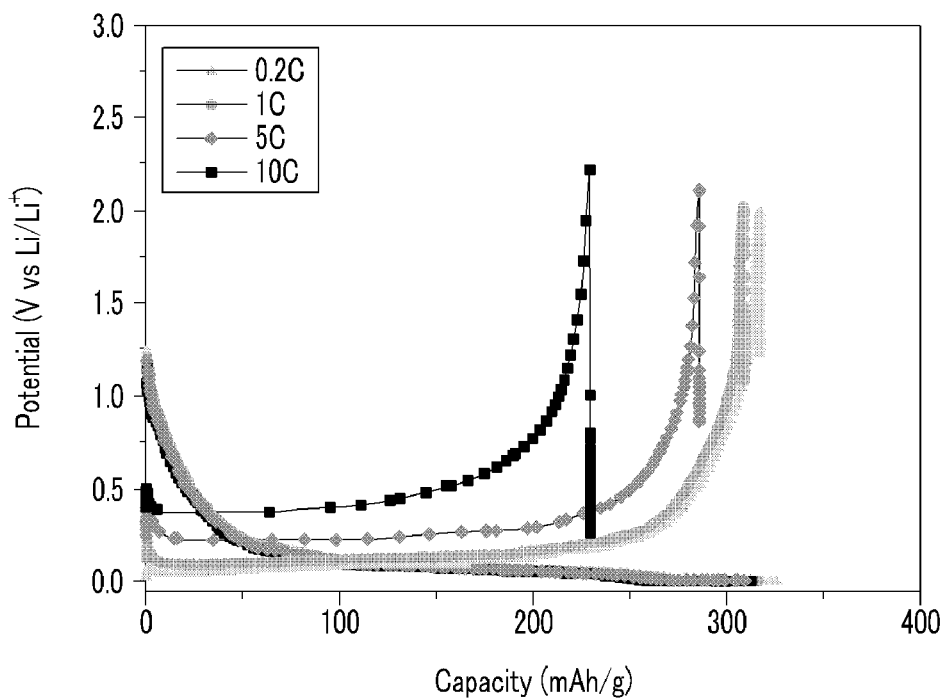
Figure 32:
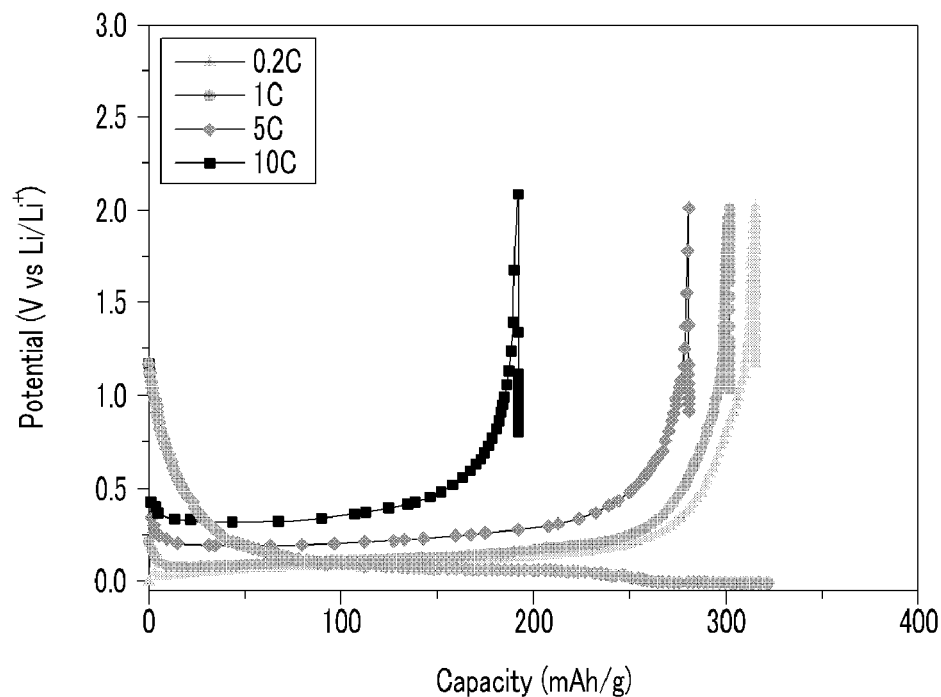
Figure 33:
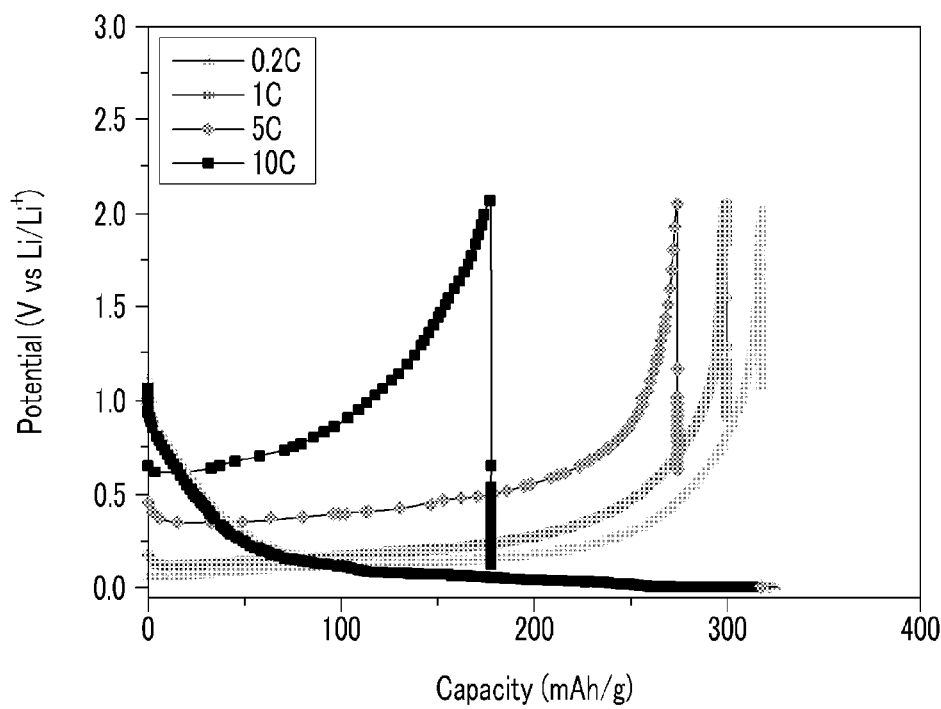
Figure 34:
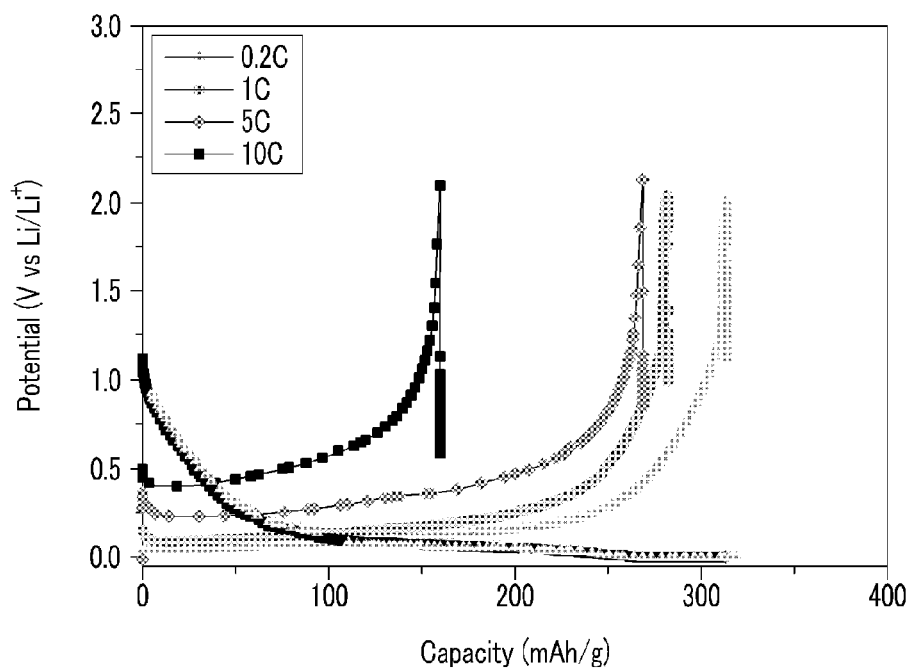

FIG. 21 is a Raman spectrum graph of the natural graphite flake according to Comparative Example 1. Referring to FIG. 21, it had a ratio ($I_{1360}/I_{1580}$) of 1360 cm$^{-1}$ peak intensity ($I_{1360}$=30.2) against 1580 cm$^{-1}$ peak intensity ($I_{1580}$=122.6) of 0.25, and thereby had crystallinity.

<Fabrication of a Test Cell>

The negative active materials according to Examples 1 to 7 and Comparative Examples 1 to 6 were mixed with CMC/SBR (carboxylmethyl cellulose/styrene-butadiene rubber) in a weight ratio of 95:5 in distilled water, preparing a negative electrode slurry. The negative electrode slurry was coated on a 10 μm-thick copper foil in a doctor blade method, dried at 180° C. for 12 hours or more, and compressed, fabricating a 50 μm-thick negative electrode substrate.

The negative electrode was used as a working electrode, while a metal lithium film was used as a counter electrode. Next, a separator made of a porous polypropylene film was inserted between them. Then, an electrolyte solution was prepared by dissolving $LiPF_6$ in a concentration of 1 mol/L in a mixed solvent of diethyl carbonate (DEC) and ethylene carbonate (EC) (DEC:EC=1:1), fabricating a 2016 coin-type half-cell.

Experimental Example 5

Charge and Discharge Characteristic Analysis

The half-cell was charged with a current density of 0.25 mA (0.2 C) to evaluate electrical characteristics. The charge was performed in a CC/CV mode. Its ending voltage was maintained to be 0.005V. Its charge was ended when its current was 0.007 mA. It was discharged in a CC mode. Its ending voltage was maintained to be 2V. It was discharged in an order of 0.2 C, 1 C, 5 C, and 10 C. It was high-rate discharged after discharging it with 0.2 C among each high rate discharge (1 C, 5 C, 10 C).

The half-cells according to Examples 1 to 7 and Comparative Examples 1 to 6 were measured regarding charge and discharge characteristics. The results are provided in FIGS. 22 to 34 and the following Table 1.

FIGS. 22 to 28 are graphs respectively showing high-rate charge and discharge characteristics of the half-cells according to Examples 1 to 7. FIGS. 29 to 34 are graphs respectively showing high-rate charge and discharge characteristics of the half-cells according to Comparative Examples 1 to 6.

The high-rate charge and discharge characteristics provided in FIGS. 22 to 28 and 29 to 34 are summarized in the following Table 1.

TABLE 1

| | Reversible capacity (mAh/g) | High-rate charge and discharge characteristic (mAh/g) | | | 10C/ 0.2C (%) | 5C/ 0.2C (%) |
|---|---|---|---|---|---|---|
| | | 1C | 5C | 10C | | |
| Example 1 | 319.4 | 311.4 | 296.6 | 288.0 | 90.2 | 92.9 |
| Example 2 | 323.0 | 310.5 | 292.5 | 268.6 | 83.2 | 90.5 |
| Example 3 | 324.8 | 310.2 | 292.6 | 272.6 | 83.9 | 90.1 |
| Example 4 | 318.3 | 313.7 | 308.4 | 290.8 | 91.4 | 96.9 |
| Example 5 | 315.3 | 311.4 | 303.5 | 280.4 | 90.0 | 96.3 |
| Example 6 | 317.1 | 310.4 | 302.9 | 278.0 | 87.7 | 95.5 |
| Example 7 | 311.2 | 306.8 | 305.4 | 300.4 | 96.5 | 98.2 |
| Comparative Example 1 | 357.6 | 339.1 | 171.0 | 105.6 | 29.5 | 47.8 |
| Comparative Example 2 | 310.9 | 289.4 | 243.5 | 107.1 | 78.3 | 34.5 |
| Comparative Example 3 | 316.6 | 308.7 | 286.0 | 229.7 | 72.5 | 90.3 |
| Comparative Example 4 | 315.0 | 301.9 | 281.0 | 192.2 | 61.0 | 89.2 |
| Comparative Example 5 | 316.8 | 298.0 | 273.4 | 177.6 | 56.1 | 86.3 |
| Comparative Example 6 | 313.1 | 281.8 | 268.8 | 159.7 | 51.0 | 85.8 |

Based on Table 1 and FIGS. 22 to 34, Examples 1 to 7 including composite particles into which fine crystalline graphite powder particles pulverized from earthy graphite and amorphous or semi-crystalline carbon are assembled, as a negative active material according to one embodiment, had a capacity ratio of 10 C against 0.2 C within a range of 83.2% to 96.5%. On the other hand, the negative active materials of Comparative Examples 1 to 6 had a capacity ratio of 10 C against 0.2 C within a range of 29.5% to 72.5%. Accordingly, a rechargeable lithium battery according to one embodiment had a remarkably excellent output characteristic.

In particular, Comparative Example 1 including graphite particles assembled into a spherical shape by using natural graphite flake as a negative active material and Comparative Example 2 including composite particles assembled into a spherical shape using unseparated or unpulverized earthy graphite as a negative active material had a remarkably deteriorated output characteristic compared with Examples 1 to 7. The reason is that natural graphite flake and unseparated or unpulverize earthy graphite had a particle size such that lithium ions had a longer diffusion distance during the charge and discharge, which means lithium ions were not easily diffused. Herein, Comparative Example 2 including earthy graphite had a somewhat better output characteristic than Comparative Example 1 including natural graphite flake. The earthy graphite (referring to FIG. 3) includes very small particles of less than 1 μm compared with natural graphite flake (referring to FIGS. 6 and 7).

In addition, Comparative Examples 3 to 6 including crystalline graphite powder particles separated or pulverized from earthy graphite but having an average particle diameter out of the range according to one embodiment had a remarkably deteriorated output characteristic compared with Examples 1 to 7. Accordingly, it is important to adjust the average particle diameter range of the crystalline graphite powder particles. Specifically, since the composite particles according to Examples 1 to 6 had an average particle diameter of 16 μm, the graphite particles according to Comparative Example 1 had an average particle diameter of 17 μm, and the composite particles according to Comparative Examples 2 to 6 had an average particle diameter of 16 μm, they had similar average particle diameters. However, since the composite particles according to Examples 1 to 6 included very fine crystalline graphite powder particles ranging from 0.2 to 3 μm and surrounded with amorphous or semi-crystalline carbon, lithium ions could be rapidly intercalated and deintercalated among graphite layers, achieving an excellent high rate characteristic. On the contrary, Comparative Example 1 included graphite powder particles in which lithium ions had a longer diffusion distance during the charge and discharge, so that lithium ions might not be easily diffused. Thus, it had a rather deteriorated output characteristic. Comparative Examples 2 to 6 had a small specific surface area that can react with lithium ions, so that the lithium ions might not be easily intercalated/deintercalated. Thus, they had a deteriorated high-rate charge and discharge characteristic.

In particular, Example 7 included composite particles having an average particle diameter of 4.6 μm had a better output characteristic than Examples 1 to 6 including composite particles having an average particle diameter of 16 μm. The reason is that the composite particles had a small size during the charge and discharge so that lithium ions had a shorter diffusion distance.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A negative active material for a rechargeable lithium battery comprising composite particles,
   wherein the composite particles comprise:
   an amorphous or semi-crystalline carbon matrix; and
   crystalline graphite powder particles having an average particle diameter of 0.2 to 3 μm dispersed in the matrix,
   wherein the composite particles have an average particle diameter ranging from 4 to 40 μm;
   wherein the crystalline graphite powder particles are earthy graphite.

2. The negative active materials of claim 1, which further comprises a coating layer comprising amorphous or semi-crystalline carbon on the surface of the composite particles.

3. The negative active material of claim 2, wherein the coating layer is 0.01 to 5 μm thick.

4. The negative active materials of claim 1, wherein the crystalline graphite powder particles have a ratio ($I_{1360}/I_{1580}$) of 1360 cm$^{-1}$ of peak intensity ($I_{1360}$) against 1580 cm$^{-1}$ of peak intensity ($I_{1580}$) of 0.1 to 0.5 in a Raman spectrum.

5. The negative active materials of claim 1, wherein the crystalline graphite powder particles have a ratio ($I_{1360}/I_{1580}$) of 1360 cm$^{-1}$ of peak intensity ($I_{1360}$) against 1580 cm$^{-1}$ of peak intensity ($I_{1580}$) of 0.1 to 0.3 in a Raman spectrum.

6. The negative active material of claim 1, wherein the amorphous or semi-crystalline carbon is formed from an amorphous or semi-crystalline carbon precursor selected from the group consisting of a hard carbon source material of sucrose, a phenol resin, a naphthalene resin, a polyvinylalcohol resin, a furfuryl alcohol resin, a polyacrylonitrile resin, a polyamide resin, a furan resin, a cellulose resin, a styrene resin, a polyimide resin, an epoxy resin, or a vinyl chloride resin; and a soft carbon source material of coal pitch, petroleum pitch, polyvinylchloride, mesophase pitch, tar, or low molecular weight heavy oil.

7. The negative active material of claim 1, wherein the composite particles comprise the amorphous or semi-crystalline carbon and the crystalline graphite powder particle in a mass ratio ranging from 0.5:9.5 to 4:6.

8. A method of preparing a negative active material for a rechargeable lithium battery, comprising:
preparing crystalline graphite powder particles having an average particle diameter of 0.2 to 3 μm by separating or pulverizing earthy graphite;
preparing a mixture by mixing the crystalline graphite powder particles and an amorphous or semi-crystalline carbon precursor;
preparing composite particles having an average particle diameter of 4 to 40 μm by assembling the mixture; and
heat-treating the composite particles to carbonize the amorphous or semi-crystalline carbon precursor.

9. A negative electrode comprising the negative active material of claim 1.

10. A rechargeable lithium battery comprising:
a positive electrode comprising a positive active material that can intercalate and deintercalate lithium ions;
a negative electrode comprising a negative active material of claim 1; and
an electrolyte.

11. The method of claim 8, which further comprises coating the composite particles prepared by carbonizing an amorphous or semi-crystalline carbon precursor using an amorphous or semi-crystalline carbon precursor.

12. The method of claim 8, wherein the amorphous or semi-crystalline carbon precursor is selected from the group consisting of a hard carbon source material of a phenol resin, a naphthalene resin, a polyvinyl alcohol resin, a polyamide resin, a furan resin, an epoxy resin, or a vinyl chloride resin; and a soft carbon source material of coal pitch, petroleum pitch, tar, or low molecular weight heavy oil.

13. A method of claim 8, wherein the heat treatment is performed at 900 to 3000° C.

* * * * *